(12) United States Patent
Akkashian et al.

(10) Patent No.: US 10,133,108 B2
(45) Date of Patent: Nov. 20, 2018

(54) VENDING MACHINES WITH LARGE AREA TRANSPARENT TOUCH ELECTRODE TECHNOLOGY, AND/OR ASSOCIATED METHODS

(71) Applicant: GUARDIAN GLASS, LLC, Auburn Hills, MI (US)

(72) Inventors: Eric W. Akkashian, Waterford, MI (US); Jason Blush, Milford, MI (US); Alexander Watanabe, Maharashtra (IN); Jian-gang Weng, Canton, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

(21) Appl. No.: 15/638,936

(22) Filed: Jun. 30, 2017

(65) Prior Publication Data

US 2017/0329166 A1    Nov. 16, 2017

Related U.S. Application Data

(63) Continuation-in-part of application No. 15/409,658, filed on Jan. 19, 2017, which is a continuation of (Continued)

(51) Int. Cl.
*G06F 3/045* (2006.01)
*G02F 1/1333* (2006.01)
(Continued)

(52) U.S. Cl.
CPC .......... *G02F 1/13338* (2013.01); *C03C 17/36* (2013.01); *C03C 17/366* (2013.01);
(Continued)

(58) Field of Classification Search
CPC ........ G06F 3/041; G06F 3/0412; G06F 3/044; G06F 2203/04103; G02F 1/1333;
(Continued)

(56) References Cited

U.S. PATENT DOCUMENTS 4,554,419 A   11/1985   King et al.
5,254,413 A   10/1993   Maricocchi
(Continued)

FOREIGN PATENT DOCUMENTS

EP    2 402 481      1/2012
JP    2010-157239    7/2010
(Continued)

OTHER PUBLICATIONS

U.S. Appl. No. 15/409,658, filed Jan. 19, 2017, Den Boer et al.

*Primary Examiner* — Joe H Cheng
(74) *Attorney, Agent, or Firm* — Nixon & Vanderhye P.C.

(57) ABSTRACT

Certain example embodiments relate to vending machines with large area transparent touch electrode (LATTE) technology, and/or associated methods. By using the low-E Ag-based coatings described herein, it is possible to create new vending machine user interfaces that are more interesting and interactive than conventional interfaces. Touch-based user interfaces may be useful in vending, attract, and game-playing modes into which example vending machines may be placed and under which they may be operated.

25 Claims, 15 Drawing Sheets

Related U.S. Application Data application No. 14/681,266, filed on Apr. 8, 2015, now Pat. No. 9,557,871.

(60) Provisional application No. 62/364,918, filed on Jul. 21, 2016.

(51) Int. Cl.

| | | |
|---|---|---|
| *G06F 3/044* | (2006.01) | |
| *G06F 3/041* | (2006.01) | |
| *C03C 17/36* | (2006.01) | |
| *G02B 1/115* | (2015.01) | |
| *G07F 11/00* | (2006.01) | |
| *G06Q 20/20* | (2012.01) | |

(52) U.S. Cl.
CPC ...... *C03C 17/3618* (2013.01); *C03C 17/3626* (2013.01); *C03C 17/3639* (2013.01); *C03C 17/3642* (2013.01); *C03C 17/3644* (2013.01); *C03C 17/3652* (2013.01); *C03C 17/3655* (2013.01); *C03C 17/3657* (2013.01); *C03C 17/3671* (2013.01); *G02B 1/115* (2013.01); *G06F 3/044* (2013.01); *G06F 3/0412* (2013.01); *C03C 2218/154* (2013.01); *G06F 2203/04103* (2013.01); *G06Q 20/20* (2013.01); *G07F 11/002* (2013.01)

(58) Field of Classification Search
CPC .. G02F 1/13338; G07F 11/002; G07F 11/007; C03C 17/3618; C03C 17/3626; C03C 17/3639; C03C 17/3642; C03C 17/3644; C03C 17/3655

See application file for complete search history.

(56) References Cited

U.S. PATENT DOCUMENTS

| | | | |
|---|---|---|---|
| 5,688,585 | A | 11/1997 | Lingle |
| 6,262,842 | B1 | 7/2001 | Ouderkirk |
| 8,124,237 | B2 | 2/2012 | Nunez-Regueiro et al. |
| 8,138,425 | B2 | 3/2012 | Lee et al. |
| 8,173,263 | B2 | 5/2012 | Lingle et al. |
| 8,187,713 | B2 | 5/2012 | Lemmer et al. |
| 8,202,619 | B2 | 6/2012 | Thomsen et al. |
| 8,203,073 | B2 | 6/2012 | Lu et al. |
| 8,263,227 | B2 | 9/2012 | Disteldorf et al. |
| 8,293,344 | B2 | 10/2012 | Lemmer et al. |
| 8,313,620 | B2 | 11/2012 | Krasnov |
| 8,895,149 | B2 | 11/2014 | Imran |
| 9,052,536 | B2 * | 6/2015 | Artwohl ............... A47F 3/0434 |
| 9,354,755 | B2 | 5/2016 | Den Boer et al. |
| 9,557,871 | B2 | 1/2017 | Den Boer et al. |
| 9,733,779 | B2 * | 8/2017 | Veerasamy ............ G06F 3/044 |
| 9,904,431 | B2 * | 2/2018 | Veerasamy ............ G06F 3/044 |
| 2002/0071075 | A1 | 6/2002 | Ogino |
| 2002/0122962 | A1 | 9/2002 | Arfsten |
| 2004/0086723 | A1 * | 5/2004 | Thomsen ............... C03C 17/36 |
| | | | 428/426 |
| 2004/0095645 | A1 | 5/2004 | Pellicori |
| 2004/0232227 | A1 * | 11/2004 | Kusakawa .............. G07F 9/026 |
| | | | 235/381 |
| 2005/0150948 | A1 * | 7/2005 | Sato ......................... G07F 9/02 |
| | | | 235/381 |
| 2005/0236417 | A1 * | 10/2005 | Baker ..................... G07F 11/26 |
| | | | 221/92 |
| 2006/0204655 | A1 | 9/2006 | Takahashi |
| 2007/0016478 | A1 * | 1/2007 | Hill ..................... G06Q 30/0251 |
| | | | 705/14.49 |
| 2007/0236618 | A1 | 10/2007 | Maag |
| 2009/0084438 | A1 | 4/2009 | De Boer |
| 2009/0155619 | A1 | 6/2009 | Nelson |
| 2009/0194157 | A1 | 8/2009 | Den Boer |
| 2009/0314621 | A1 | 12/2009 | Hotelling |
| 2009/0324967 | A1 * | 12/2009 | Disteldorf ............... C03C 17/36 |
| | | | 428/428 |
| 2010/0013784 | A1 | 1/2010 | Nashiki et al. |
| 2010/0046191 | A1 | 2/2010 | Den Boer et al. |
| 2010/0163994 | A1 | 7/2010 | Tang et al. |
| 2010/0268792 | A1 * | 10/2010 | Butler ..................... G06Q 30/02 |
| | | | 709/217 |
| 2011/0193799 | A1 | 8/2011 | Jun et al. |
| 2012/0080090 | A1 | 4/2012 | Thomsen |
| 2012/0114919 | A1 | 5/2012 | Nakajima et al. |
| 2012/0219821 | A1 | 8/2012 | Frank et al. |
| 2012/0227259 | A1 | 9/2012 | Badaye et al. |
| 2012/0285089 | A1 * | 11/2012 | Artwohl ............... A47F 3/0434 |
| | | | 49/70 |
| 2013/0004678 | A1 | 1/2013 | Krasnov et al. |
| 2013/0050149 | A1 | 2/2013 | Rattray |
| 2013/0211583 | A1 | 8/2013 | Borra |
| 2013/0308192 | A1 | 11/2013 | Shimoda |
| 2014/0015762 | A1 | 1/2014 | Weng et al. |
| 2014/0092028 | A1 | 4/2014 | Prest et al. |
| 2014/0092324 | A1 | 4/2014 | Kim et al. |
| 2014/0145999 | A1 | 5/2014 | Den Boer et al. |
| 2015/0036066 | A1 | 2/2015 | Chan et al. |
| 2015/0274584 | A1 | 10/2015 | Kleinhempel |
| 2016/0124120 | A1 | 5/2016 | Varanasi |
| 2016/0253004 | A1 | 9/2016 | Den Boer et al. |
| 2017/0139507 | A1 | 5/2017 | Den Boer et al. |

FOREIGN PATENT DOCUMENTS

| | | |
|---|---|---|
| JP | 2012-133779 | 7/2012 |
| WO | 2012/099394 | 7/2012 |
| WO | WO 2012/099253 | 7/2012 |

* cited by examiner

VENDING MACHINES WITH LARGE AREA TRANSPARENT TOUCH ELECTRODE TECHNOLOGY, AND/OR ASSOCIATED METHODS

CROSS-REFERENCE TO RELATED APPLICATION

This application claims the benefit of U.S. Application Serial No. 62/364,918 filed on Jul. 21, 2016, the entire contents of which are hereby incorporated herein by reference. This application also is a continuation-in-part application of U.S. application Ser. No. 15/409,658 filed Jan. 19, 2017, which is a continuation of U.S. application Ser. No. 14/681,266 filed Apr. 8, 2015, now U.S. Pat No. 9,557,871, the entire contents of each of which are hereby incorporated by reference in their entirety.

This application also incorporates by reference the entire contents of each of U.S. application Serial No. 15/146,270 filed on May 4, 2016, now U.S. Pat. No. 9,740,357, which is a continuation of U.S. application Ser. No. 13/685,871 filed on Nov. 27, 2012, now U.S. Pat. No. 9,354,755.

TECHNICAL FIELD

Certain example embodiments relate to vending machines and/or associated methods. More particularly, certain example embodiments relate to vending machines with large area transparent touch electrode (LATTE) technology, and/or associated methods.

BACKGROUND AND SUMMARY

A capacitive touch panel includes an insulator such as glass, coated with a conductive coating. As the human body is also an electrical conductor, touching the surface of the panel results in a distortion of the panel's electrostatic field, measurable as a change in capacitance. A transparent touch panel may be combined with a display such as a liquid crystal panel to form a touchscreen. A projected capacitive (PROCAP) touch panel allows finger or other touches to be sensed through a protective layer in front of the conductive coating. The protective layer increases durability, while the ability to sense touches through an insulator allows a user to operate the touch panel while wearing gloves or the like.

FIGS. 1(a) to 1(g) illustrate an example of a related art projected capacitive touch panel, e.g., see U.S. Pat. No. 8,138,425, the disclosure of which is hereby incorporated herein by reference.

Referring to FIG. 1(a), substrate 11, x-axis conductor 12 for rows, insulator 13, y-axis conductor 14 for columns, and conductive traces 15 are provided. Substrate 11 may be a transparent material such as glass. X-axis conductors 12 and y-axis conductors 14 may be a transparent conductive coating, typically indium tin oxide (ITO). Insulator 13 may be any insulating material (for example, silicon nitride), which inhibits conductivity between x-axis conductors 12 and y-axis conductors 14. Traces 15 provide electrical conductivity between each of the plurality of conductors and a signal processor (not shown).

Referring to FIG. 1(b), x-axis conductor 12 (e.g., ITO) is formed on substrate 11. The ITO is coated in a continuous layer on substrate 11 and then is subjected to a first photolithography process in order to pattern the ITO into x-axis conductors 12. FIG. 1(c) illustrates cross-section A-A' of FIG. 1(b), including x-axis conductor 12 formed on substrate 11. Referring to FIG. 1(d), insulator 13 is then formed on the substrate 11 over x-axis channel(s) of x-axis conductor 12. FIG. 1(e) illustrates cross-section B-B' of FIG. 1(d), including insulator 13 which is formed on substrate 11 and x-axis conductor 12. The insulator islands 13 shown in FIGS. 1(d)-(e) are formed by depositing a continuous layer of insulating material (e.g., silicon nitride) on the substrate 11 over the conductors 12, and then subjecting the insulating material to a second photolithography, etching, or other patterning process in order to pattern the insulating material into islands 13. Referring to FIG. 1(f), y-axis conductors 14 are then formed on the substrate over the insulator islands 13 and x-axis conductors. The ITO is coated on substrate 11 over 12, 13, and then is subjected to a third photolithography or other patterning process in order to pattern the ITO into y-axis conductors 14. While most of y-axis conductor material 14 is formed directly on substrate 11, the y-axis channel is formed on insulator 13 to inhibit conductivity between x-axis conductors 12 and y-axis conductors 14. FIG. 1(g) illustrates cross-section C-C' of FIG. 1(f), including part of a y-axis conductor 14, which is formed on the substrate 11 over insulator island 13 and over an example x-axis conductor 12. It will be appreciated that the process of manufacturing the structure shown in FIGS. 1(a)-(g) requires three deposition steps and three photolithography type processes, which can render the process of manufacture burdensome, inefficient, and costly.

FIG. 1(h) illustrates another example of an intersection of x-axis conductor 12 and y-axis conductor 14 according to a related art projected capacitive touch panel. Referring to FIG. 1(h), an ITO layer is formed on the substrate 11 and can then be patterned into x-axis conductors 12 and y-axis conductors 14 in a first photolithography process. Then, an insulating layer is formed on the substrate and is patterned into insulator islands 13 in a second photolithography or etching process. Then, a metal conductive layer is formed on the substrate 11 over 12-14 and is patterned into conductive bridges 16 in a third photolithography process. Metal bridge 16 provides electrical conductivity for a y-axis conductor 14 over an x-axis conductor 12. Again, this process of manufacture requires three deposition steps and three different photolithography processes.

The projected capacitive touch panels illustrated in FIG. 1(a) through 1(h) may be mutual capacitive devices and self-capacitive devices.

In a mutual capacitive device, there is a capacitor at every intersection between an x-axis conductor 12 and a y-axis conductor 14 (or metal bridge 16). A voltage is applied to x-axis conductors 12, while the voltage of y-axis conductors 14 is measured (and/or vice versa). When a user brings a finger or conductive stylus close to the surface of the device, changes in the local electrostatic field reduce the mutual capacitance. The capacitance change at every individual point on the grid can be measured to accurately determine the touch location.

In a self-capacitive device, the x-axis conductors 12 and y-axis conductors 14 operate essentially independently. With self-capacitance, the capacitive load of a finger or the like is measured on each x-axis conductor 12 and y-axis conductor 14 by a current meter.

As shown in FIGS. 1(g) and 1(h), related art projected capacitive touch panels require at least three thin film layers (for example, an ITO layer(s), insulator, and another ITO layer or metal bridge) formed on substrate 11 in making the touch-sensitive structure, and possibly a further protective layer(s) thereover. And each thin film layer typically has its own photolithography and/or laser patterning process, which can increase production costs and/or time.

As described above, transparent conductors 12 and 14 are typically indium tin oxide (ITO), which is a costly material. Thin layers of ITO also have a high sheet resistance (at least about 100 ohms/square). In order for an ITO layer to have a sheet resistance less than 5 ohms/sq., the layer typically must be thick (for example, greater than 400 nm). A thick layer of ITO is both more costly and less transparent. Thus, the high sheet resistance of thin layers of ITO can limit its use in layouts requiring long narrow traces on large format touch panels (for example, panels with a diagonal measurement of more than 5 inches). It will be appreciated that there exists a need in the art to address one or more of the above-identified problems.

These and other limitations may be overcome by a projected capacitive touch panel with a silver-inclusive transparent conductive layer(s), where the silver-inclusive layer may be sandwiched between at least first and second dielectric layers. Certain example embodiments relate to designs that incorporate one or more low-emissivity (low-E), Ag-based coatings to create a large area transparent touch electrode (LATTE) that can handle multi-touch points. Mutual capacitance and self-capacitance designs are disclosed herein. The low-E coatings described herein may be less than half as costly as their ITO counterparts, and they may offer a better resistivity/transmission tradeoff, making them more readily usable in large applications. LATTE technology may be used in connection with a variety of different end-applications including, for example, vending machines, as in certain example embodiments.

In certain example embodiments, a vending machine is provided. A cabinet includes a plurality of product placement areas. A window to the product placement areas is connected to the cabinet. A first transparent multi-layer low-emissivity (low-E) coating is supported by the window and patterned into a first set of electrodes, with the first set of electrodes being configured to enable all or part of the window to be used as a touch panel configured to accept touch-related inputs to the vending machine. Processing resources include at least one processor and a memory. The memory comprises instructions that, when executed, are configured to: (a) receive touch-related operation information corresponding to accepted touch-related inputs, with the touch-related operation information being indicative of touch positions and touch types, and with the touch types including touches of the window, non-touch proximity detections, and gestures; and (b) control the vending machine to operate in one of a plurality of different operating modes and respond to received touch-related operation information, the different operating modes including product-vending and game-playing modes.

In certain example embodiments, a vending machine is provided. A cabinet includes a plurality of product placement areas. A capacitive touch panel is configured to accept touch-related inputs to the vending machine. A first glass substrate is arranged as a window to the product placement areas, with the first glass substrate being connected to the cabinet and forming part of the touch panel. A first transparent multi-layer low-E coating is supported by the first glass substrate and is patterned into a first set of electrodes, e.g., with the first low-E coating including a layer comprising Ag, a layer comprising zinc oxide directly below and in contact with the layer comprising Ag, a layer comprising Ni and/or Cr directly above and in contact with the layer comprising Ag, and at least one silicon-inclusive layer above and at least one silicon-inclusive layer below the layer comprising Ag. Processing resources include at least one processor and a memory, with the memory comprising instructions that, when executed, are configured to control the vending machine to operate in one of a plurality of different operating modes and, in connection therewith, respond to touch-related operation signals received from the touch panel, the different operating modes including product-vending and game-playing modes.

Method of making and/or using these and/or other vending machines also are contemplated herein.

BRIEF DESCRIPTION OF THE DRAWINGS

These and other features and advantages may be better and more completely understood by reference to the following detailed description of exemplary illustrative embodiments in conjunction with the drawings, of which:

FIGS. 15(a) to 15(e) schematically demonstrate how the FIG. 13 example vending machine may be used to play games, in accordance with certain example embodiments.

DETAILED DESCRIPTION

Figure 1A:
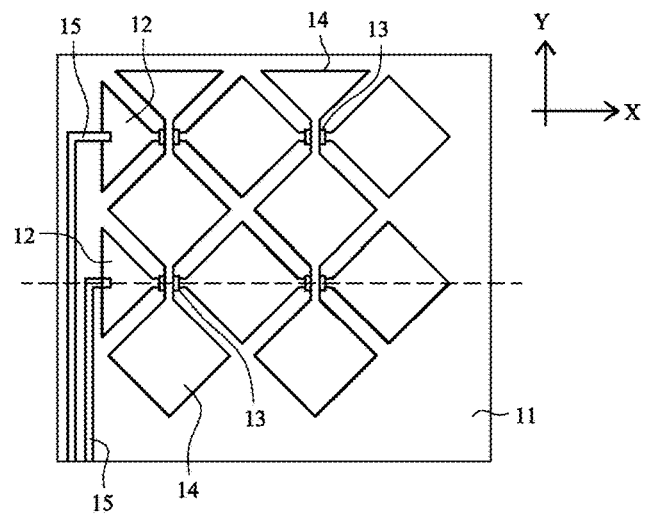
FIGS. 1(a) to 1(h) illustrate examples of related art projected capacitive touch panels.
Figure 1B:
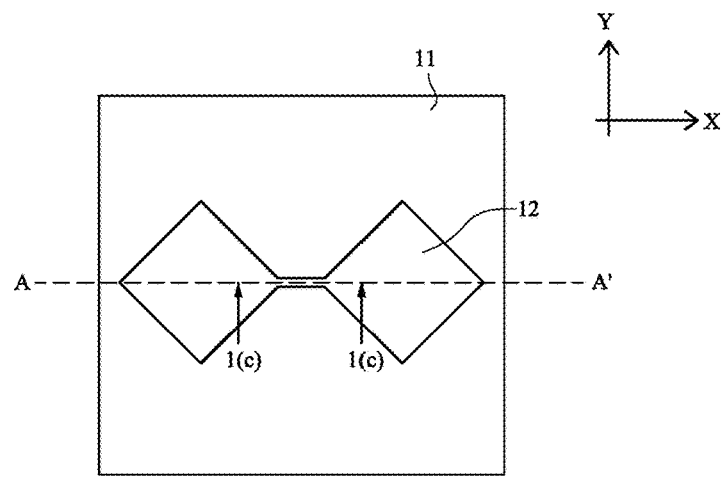
Figure 1C:
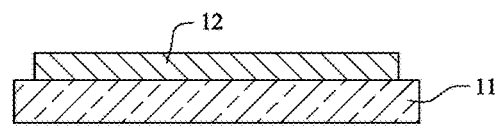
Figure 1D:
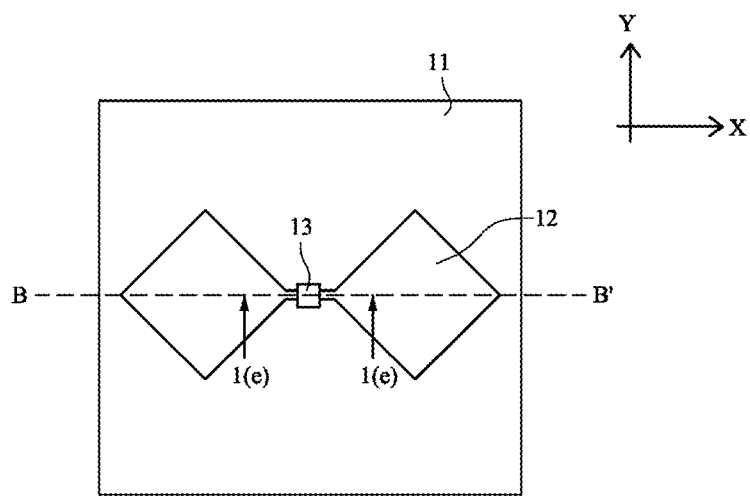
Figure 1E:
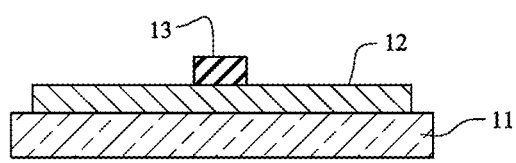
Figure 1F:
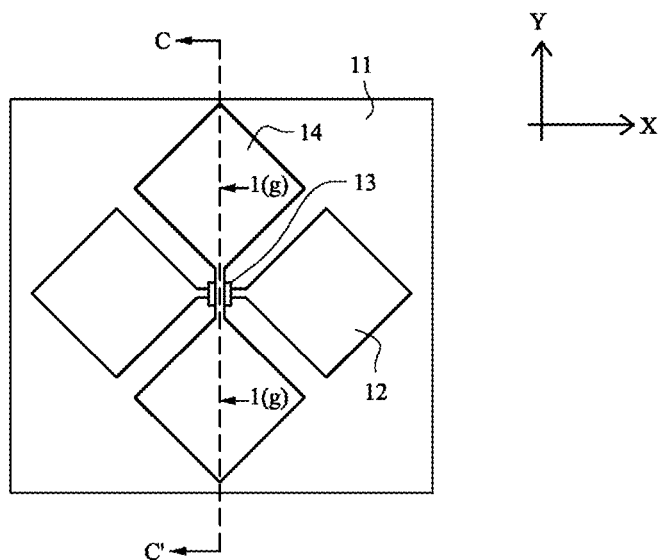
Figure 1G:
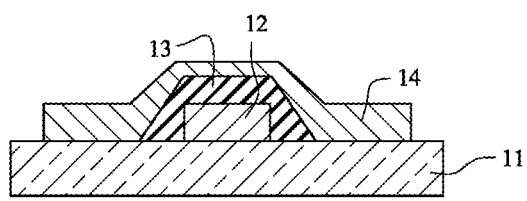
Figure 1H:
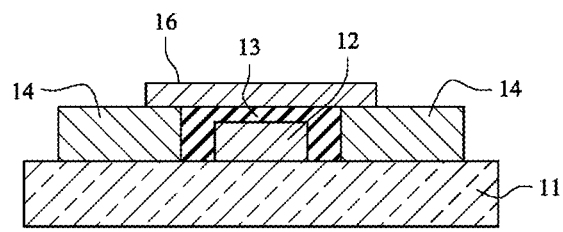

A detailed description of certain example embodiments is provided with reference to the accompanying drawings. Like reference numerals indicate like parts throughout the drawings.

Figure 2A:
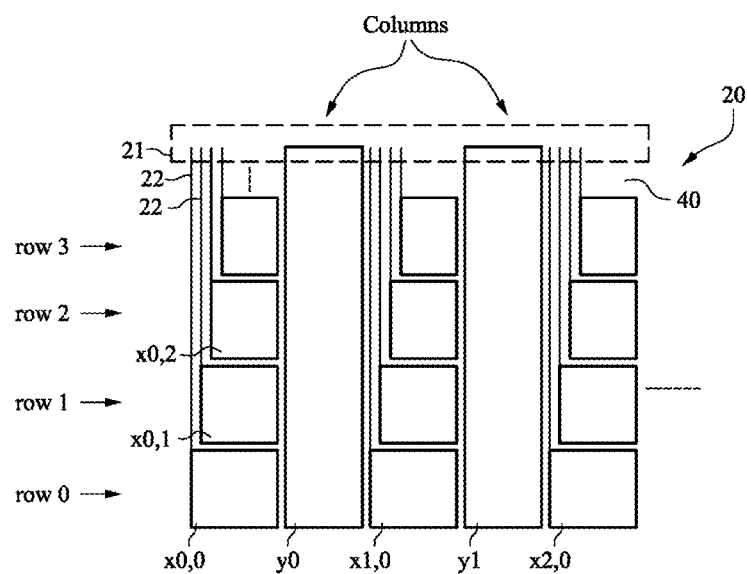
FIG. 2(a) illustrates a top or bottom plan layout of a projected capacitive touch panel according to an example embodiment.

FIG. 2(a) illustrates a top/bottom plan layout of a projected capacitive touch panel according to an example embodiment of this invention. Referring to FIG. 2(a), touch panel 20 is provided. Touch panel 20 includes a matrix of electrodes including n columns and m rows, provided on a substrate 40. The matrix of row/column electrodes is typically provided on the side of the substrate (e.g., glass substrate 40) that is opposite the side touched by person(s) using the touch panel. In other words, when the touch panel is touched by a finger, stylus, or the like, the substrate 40 is typically located between the finger and the matrix of row/column electrodes. A change in capacitance between adjacent row and column electrodes in the matrix as a result of the proximity of a finger or the like is sensed by the electronic circuitry, and the connected circuitry can thus detect where the panel is being touched by a finger or the like.

For example, referring to FIG. 2(a), row 0 includes row electrodes $x_{0,0}$, $x_{1,0}$, $x_{2,0}$, etc., through $x_{n,0}$ and columns 0, 1 and 2 respectively include column electrodes $y_0$, $y_1$, $y_2$, etc., through $y_n$. Optionally, the x electrodes in a column direction may also be grouped for column sensing. The number of row and column electrodes is determined by the size and resolution of the touch panel. In this example, the top-right row electrode is $x_{n,m}$.

Each row electrode $x_{0,0}$-$x_{n,m}$ of touch panel 20 is electrically connected to interconnect area 21 and corresponding processing circuitry/software by a conductive trace 22. Each column electrode $y_0$-$y_n$ is also electrically connected to interconnect area 21 and corresponding processing circuitry/software. The conductive traces 22 are preferably formed of the same transparent conductive material as the row and column electrodes (e.g., same material as at least row electrodes $x_{0,0}$, $x_{1,0}$, $x_{2,0}$, etc.). Thus, in certain example embodiments, the matrix of row and column electrodes and corresponding traces 22 can be formed on the substrate (e.g., glass substrate) 40 by forming a single coating (single or multi-layer coating) on the substrate and by performing only one (or maximum two) photolithography processes. In certain example embodiments, the silver-inclusive coating (e.g., see example coatings of FIGS. 4-6) is formed (e.g., sputter-deposited) on the substrate 40 and is then subjected to photolithography and/or laser patterning to pattern the silver-inclusive coating into traces 22, row electrodes $x_{0,0}$, $x_{1,0}$, $x_{2,0}$, $x_{0,1}$, $x_{0,2}$, $x_{0,3}$, etc., through $x_{n,m}$, and column electrodes $y_0$-$y_n$.

Because the row electrodes $x_{0,0}$-$x_{n,m}$, column electrodes $y_0$-$y_n$, and traces 22 do not overlap as viewed from above/below, the row electrodes $x_{0,0}$-$x_{n,m}$, column electrodes $y_0$-$y_n$, and traces 22 may be formed on the same plane parallel (or substantially parallel) to substrate 40 on which the electrodes and traces are formed. Significant portions of traces 22 may also be parallel (or substantially parallel) to the column electrodes in the plane parallel (or substantially parallel) to the substrate 40.

Accordingly, touch panel 20 may be made via a smaller number of photolithography or laser patterning steps while achieving traces that achieve sufficient transparency and conductivity, thereby reducing production costs and resulting in a more efficient touch panel for use in a display assembly or the like.

Figure 2B:
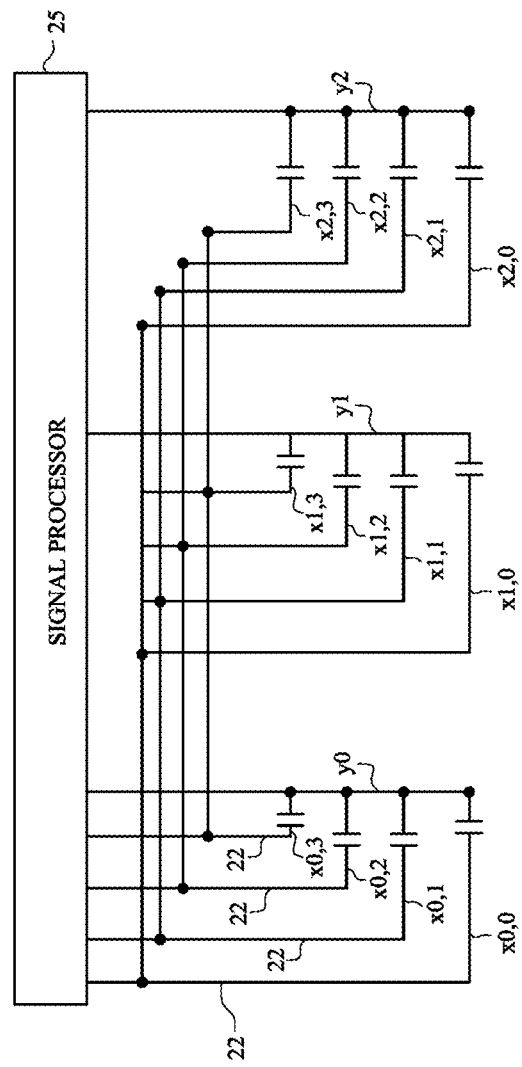
FIG. 2(b) illustrates a schematic representation of circuitry for the projected capacitive touch panel of FIG. 2(a) and/or 3.

FIG. 2(b) illustrates a schematic representation of circuitry for the touch panel 20 illustrated in FIG. 2(a), according to certain example embodiments. In touch panel 20, there is a capacitance between each row electrode and the adjacent column electrode (for example, between row electrode $x_{0,0}$ and column electrode $y_0$). This capacitance can be measured by applying a voltage to a column electrode (for example, column electrode $y_0$) and measuring the voltage of an adjacent row electrode (for example, row electrode $x_{0,0}$). When a user brings a finger or conductive stylus close to touch panel 20, changes in the local electrostatic field reduce the mutual capacitance. The capacitance change at individual points on the surface can be measured by measuring each pair of row electrodes and column electrodes in sequence.

The traces 22 of each row electrode in the same row (for example, the traces 22 of row electrodes $x_{0,0}$, $x_{1,0}$, $x_{2,0}$, etc., through $x_{n,0}$ of row 0) may be electrically connected together (as shown in FIG. 2(b)). The interconnection of the first row segments to each other, second row segments to each other, etc., may be made on a flexible circuit(s) attached at the periphery of the touch panel in the interconnection area, so that no cross-overs are needed on the glass. In that instance, a voltage is applied to a column electrode and the voltage of each row is measured in sequence before the process is repeated with a voltage applied to another column. Alternatively, each trace 22 may be connected to signal processor 25 and the voltage of each trace 22 may be measured individually.

The same capacitance may be measured by applying a voltage to a row electrode and measuring the voltage on an adjacent column electrode rather than applying a voltage to a column electrode and measuring the voltage of an adjacent row electrode.

Signal processing (for example, applying and measuring voltages, measuring the capacitance between adjacent electrodes, measuring changes in capacitance over time, outputting signals in response to user inputs, etc.) may be performed by signal processor 25. Signal processor 25 may be one or more hardware processors, may include volatile or non-volatile memory, and may include computer-readable instructions for executing the signal processing. Signal processor 25 is electrically connected to the column electrodes $y_0$-$y_n$ and electrically connected to the row electrodes $x_{0,0}$-$x_{n,m}$ through the traces 22. Signal processor 25 may or may not be located on the same plane as row electrodes $x_{0,0}$-$x_{n,m}$, column electrodes $y_0$-$y_n$, and traces 22 (for example, in interconnect area 21 of FIG. 2(a)).

Figure 3:
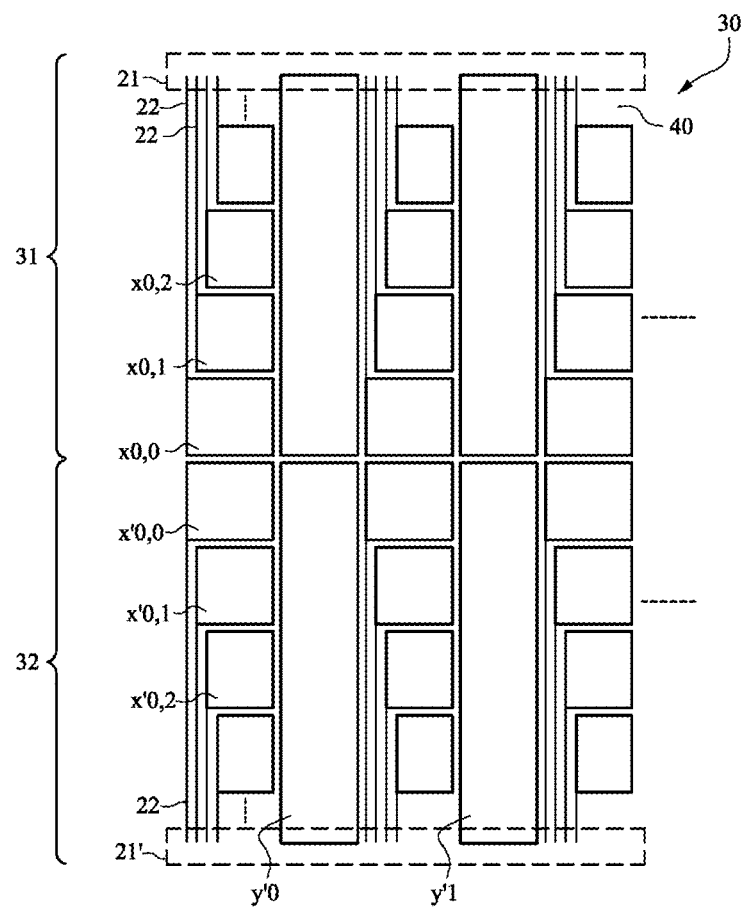
FIG. 3 illustrates a top or bottom plan layout of a projected capacitive touch panel according to another example embodiment.

FIG. 3 illustrates a layout of a projected capacitive touch panel according to other example embodiments. Referring to FIG. 3, touch panel 30 is similar to touch panel 20 of FIG. 2(a), except that touch panel 30 is divided into upper section 31 and lower section 32, each of which includes a matrix of electrodes including n columns and m rows. For example, row 0 of upper section 31 includes row electrodes $x_{0,0}$, $x_{1,0}$, $x_{2,0}$, etc., through $x_{n,0}$. Upper section 31 also includes column electrodes $y_0$, $y_1$, $y_2$, etc., through $y_n$. Likewise, lower section 32 would also include row electrodes, and column electrodes $y_0$-$y_n$ that may be electrically separate from the column electrodes $y_0$-$y_n$ of the upper section 31.

Thus, lower section 32 also includes a matrix of row electrodes including n columns and m rows, and n column electrodes. Lower section 32 may have more or less rows than upper section 31 in different example embodiments.

The number of row and column electrodes of touch panel 30 is determined by the size and resolution of the touch panel.

Each column electrode of upper section 31 is electrically connected to interconnect area 21, and each row electrode of upper section 31 is electrically connected to interconnect area 21 by a trace 22. As with the FIG. 2 embodiment, traces may or may not be used for connecting the column electrodes of upper section 31 to the interconnect area. Each column electrode of lower section 32 is electrically connected to interconnect area 21' and each row electrode of lower section 32 is electrically connected to interconnect area 21' by a trace 22. Again, traces may or may not be used for connecting the column electrodes of the lower section 32 to the interconnect area 21'.

Still referring to FIG. 3, touch panel 30 is similar to touch panel 20 in that there is a capacitance between each row electrode and the adjacent column electrode which may be measured by applying a voltage to a column electrode and measuring the voltage of an adjacent row electrode (or, alternatively, by applying a voltage to a row electrode and measuring the voltage of an adjacent column electrode). When a user brings a finger or conductive stylus close to touch panel 30, changes in the local electrostatic field reduce the mutual capacitance. The capacitance change at individual points on the surface can be measured by measuring the mutual capacitance of each pair of row electrodes and column electrodes in sequence.

Because the row electrodes and column electrodes illustrated in FIG. 3 do not overlap, the row electrodes and column electrodes may be formed on the same plane, in the manner explained above in connection with FIG. 2. Accordingly, electrode structure for the touch panel 30 may be thin in nature and may be patterned with one process (for example, one photolithography process or one laser patterning process), which can reduce the production cost of the projected capacitive touch panel.

As one of ordinary skill in the art will recognize, touch panels 20 and 30 described are not limited to the orientation described above and shown in FIGS. 2-3. In other words, the terms "row," "column," "x-axis," and y-axis" as used in this application are not meant to imply a specific direction. Touch panel 20 of FIG. 2(a), for example, may be modified or rotated such that interconnect area 21 is located in any part of touch panel 20.

As illustrated in FIGS. 2(a) and 3, narrow transparent conductive traces 22 are routed to electrically connect electrodes to interconnect area 21 (and interconnect area 21'). Because of the large resistance of the narrow ITO traces, narrow ITO traces may only been used in small touch panels, such as for smart phones. To use one of the layouts illustrated in FIGS. 2(a) and 3 on larger touch panels (for example, measuring more than 10 inches diagonally), a transparent conductive coating with low sheet resistance may be used. The silver inclusive coatings shown in FIGS. 4-6, for use in forming the row/column electrodes and traces 22, are advantageous in this respect because they have a much lower sheet resistance than typical conventional ITO traces.

Figure 4:
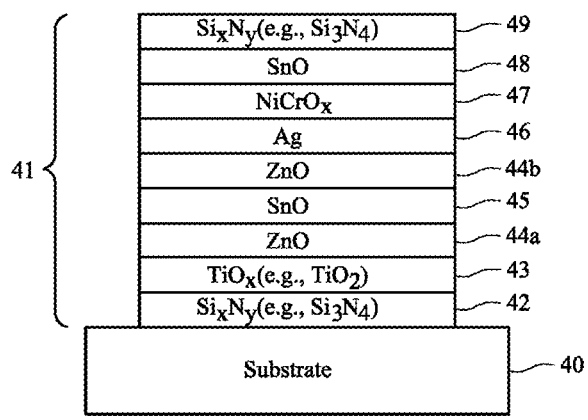
FIG. 4 illustrates a cross-sectional view of a silver-inclusive transparent conductive coating for a touch panel of FIGS. 2-3, according to certain example embodiments.
Figure 5:
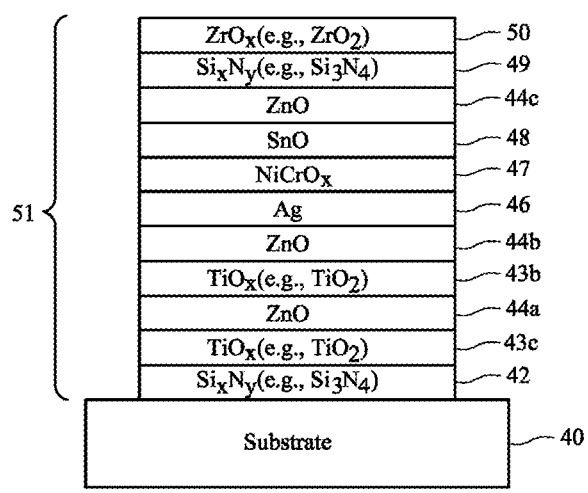
FIG. 5 illustrates a cross-sectional view of another example silver-inclusive transparent conductive coating for a touch panel of FIGS. 2-3.
Figure 6:
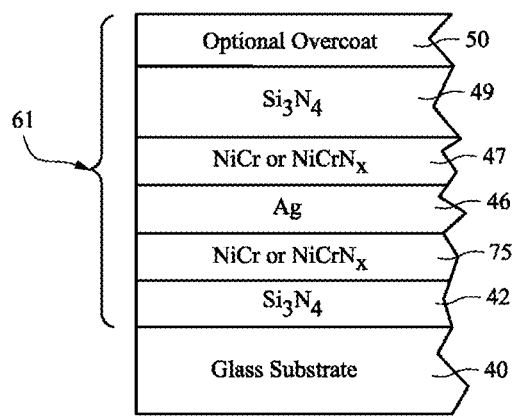
FIG. 6 illustrates a cross-sectional view of yet another example silver-inclusive transparent conductive coating for a touch panel of FIGS. 2-3.

Examples of silver-inclusive transparent conductive coatings (TCCs) with low sheet resistance, for forming row electrodes, column electrodes, and traces 22 are illustrated in FIGS. 4-6, according to certain example embodiments. In each of FIGS. 4-6, the low sheet resistance and high transparency of the TCC allow the TCC to form the long narrow traces 22 of the touch panels illustrated in FIGS. 2(a) and 3, as well as the row and column electrodes.

Referring to FIG. 4, coating (or layer system) 41 is provided, either directly or indirectly, on substrate 40. Substrate 40 may be, for example, glass. Coating 41 may include, for example, bottom dielectric silicon nitride based and/or inclusive layer 42 which may be $Si_3N_4$ (which may or may not be doped with other material(s) such as aluminum in certain example instances) or of the Si-rich type for haze reduction, or of any other suitable stoichiometry silicon nitride in different embodiments of this invention; a dielectric high index layer 43 of or including a material such as titanium oxide or niobium oxide, which may include titanium oxide (e.g., $TiO_2$ or other suitable stoichiometry); and first and second dielectric layers of or including zinc oxide 44a and 44b that may be split by a dielectric "glue" layer 45 of or including tin oxide; a silver-based conductive layer 46; an upper contact layer including nickel and/or chromium 47 which may be oxided and/or nitrided; a second layer of or including tin oxide 48; and an outer-most protective layer 49 of or including silicon nitride. The dielectric high index layer 43 may be fully oxidized or sub-stoichiometric in different example embodiments. The seed layer comprising zinc oxide 44b and the upper contact layer of or including nickel and/or chromium 47 directly contact the silver-based conductive layer 46.

While various thicknesses and materials may be used in layers in different embodiments of this invention, example thicknesses and materials for the respective sputter-deposited layers of coating 41 on the glass substrate 40 in the FIG. 4 embodiment are as follows, from the glass substrate outwardly:

TABLE 1

| Ref | Material | Preferred Thickness (Å) | More Preferred Thickness (Å) | Example Thickness 1 (Å) | Example Thickness 2 (Å) |
|---|---|---|---|---|---|
| 42 | $Si_xN_y$ | 1-500 | 100-300 | 160 | 160 |
| 43 | $TiO_x$ | 75-125 | 85-115 | 100 | 100 |
| 44a | ZnO | 35-75 | 40-70 | 60 | 50 |
| 45 | SnO | 35-200 | 50-135 | 100 | 70 |
| 44b | ZnO | 30-200 | 40-130 | 60 | 100 |
| 46 | Ag | 60-110 | 70-100 | 85 | 85 |
| 47 | NiCrOx | 20-40 | 23-37 | 30 | 30 |
| 48 | SnO | 150-275 | 170-255 | 220 | 200 |
| 49 | $Si_xN_y$ | 1-1000 | 100-500 | 220 | 250 |

In certain example embodiments, the layers 44a and 44b may have matching or substantially matching thicknesses. For instance, the thicknesses of these layers may differ by no more than 15% in certain example instances, no more than 10% in other example instances, and no more than 3-5% in yet other example instances. This is the case with Example 1 above, but is not the case with Example 2 above.

Referring to FIG. 5, another example transparent conductive coating (or layer system) 51 is provided, either directly or indirectly, on substrate 40. Substrate 40 may be, for example, glass. As with the FIG. 4 embodiment, FIG. 5 includes, for example, bottom dielectric silicon nitride based and/or inclusive layer 42 and a dielectric high index layer 43a, which may be of or include titanium oxide or niobium oxide (e.g., $TiO_2$ or other suitable stoichiometry). However, as shown in FIG. 5, the first and second dielectric layers comprising zinc oxide 44a and 44b (which may be doped with Al or the like) are split by a layer of or including titanium oxide (e.g., $TiO_2$ or other suitable stoichiometry) 43b. Another way of thinking about this is that the lower dielectric high index layer comprising titanium oxide 43 is split into two sub-layers (43a and 43b) by a first layer of or including zinc oxide 44a. An upper contact layer including nickel and/or chromium 47, which may be oxided and/or nitrided, a layer of or including tin oxide 48, a dielectric layer of or including zinc oxide 44c, and another dielectric silicon nitride based layer 49 may be provided above a conductive silver-based layer 46. A third zinc oxide inclusive layer 44c may be interposed between the layer comprising tin oxide 48 and the silicon nitride based layer 49. An optional zirconium oxide inclusive top coat 50 is shown as an outer-most layer (and thus above the silicon nitride based layer 49) in FIG. 5. This zirconium oxide inclusive top coat 50 may provide further durability improvements.

While various thicknesses and materials may be used in layers in different embodiments of this invention, example thicknesses and materials for the respective sputter-deposited layers on the substrate 40 in the FIG. 5 embodiment are as follows, from the substrate 40 outwardly:

TABLE 2

| Ref | Material | Preferred Thickness (Å) | More Preferred Thickness (Å) | Example Thickness 1 (Å) | Example Thickness 2 (Å) |
|---|---|---|---|---|---|
| 42 | $Si_xN_y$ | 1-500 | 10-300 | 156 | 156 |
| 43c | $TiO_x$ | 15-50 | 30-40 | 33 | 35 |
| 44a | ZnO | 70-200 | 95-125 | 114 | 110 |
| 43b | $TiO_x$ | 15-50 | 30-40 | 33 | 35 |
| 44b | ZnO | 70-200 | 95-125 | 114 | 110 |
| 46 | Ag | 70-120 | 80-100 | 90 | 90 |
| 47 | NiCrOx | 1-100 | 10-50 | 30 | 30 |
| 48 | SnO | 110-150 | 115-145 | 130 | 130 |
| 44c | ZnO | 70-200 | 95-125 | 109 | 109 |
| 49 | $Si_xN_y$ | 115-185 | 125-155 | 140 | 140 |
| 50 | $ZrO_x$ | 1-200 | 10-80 | 40 | 40 |

FIG. 6 illustrates another example transparent conductive coating that may be used to form the row and column electrodes, and traces 22, in FIGS. 2-3. The coating of FIG. 6 includes, from the glass substrate 40 outwardly, dielectric layer of or including silicon nitride, lower contact layer 75 of or including NiCr, NiCrOx, NiCrNx or the like, conductive layer 46 of or including silver, upper contact layer 47 of or including NiCr, NiCrOx, NiCrNx or the like, dielectric layer 49 of or including silicon nitride, and optional overcoat 50 of a material such as zirconium oxide.

A projected capacitive touch panel may be formed by using a silver-inclusive TCC (for example, coating 41 of FIG. 4, coating 51 of FIG. 5, or coating 61 of FIG. 6) patterned on a substrate 40 (for example, glass) in a layout to form the row electrodes $x_{0,0}$-$x_{n,m}$, column electrodes $y_0$-$y_n$, and traces 22 of touch panels 20 or 30 illustrated in FIGS. 2-3. Because the silver-inclusive TCC may be patterned with one photolithography process and/or laser patterning process, the overall cost of the projected capacitive panel is reduced.

Figure 7:
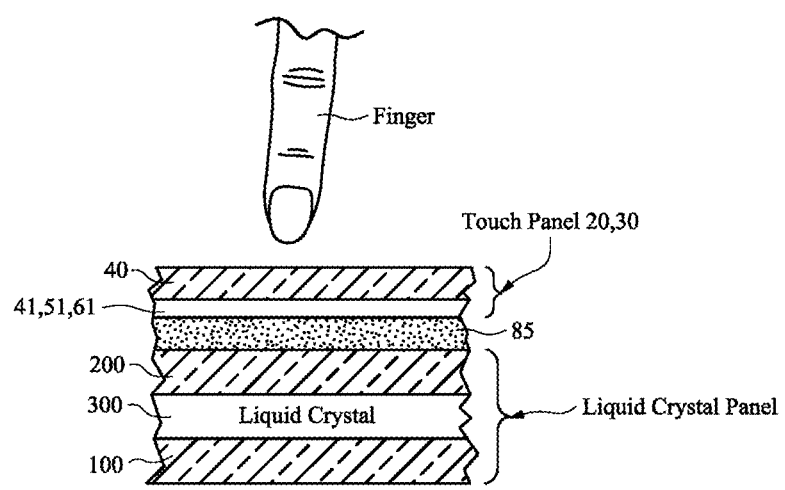
FIG. 7 is a cross-sectional view of a display assembly according to an example embodiment of this invention, including a touch panel according to any of FIGS. 2-6 coupled to a liquid crystal panel, for use in electronic devices such as portable phones, portable pads, computers, and/or so forth, in accordance with certain example embodiments.

Silver-inclusive TCCs 41, 51, 61 are inexpensive, have a low sheet resistance (preferably less than 15 ohms/square, more preferably less than about 10 or 5 ohms/square, with an example being approximately 4 ohms per square) and maintain high transmittance (preferably, greater than 70%, more preferably greater than about 80 percent). The TCC (41, 51 or 61) may be deposited on a major surface of the substrate 40 away from the user so as to reduce corrosive exposure to the atmosphere or contact with a finger or stylus. For example, the example display assembly shown in FIG. 7 includes a touch panel (20 or 30) mounted on a liquid crystal display panel. The row electrodes, column electrodes, and traces are form at 41, 51, 61 in FIG. 7 on the surface of the glass substrate 40 opposite the finger, and the touch panel (20, 30) may be adhered to the LCD panel via an index-matching adhesive layer 85. The LCD panel includes first and second substrates (e.g., glass substrates) 100, 200 with a liquid crystal layer 300 provided therebetween. In order to form a touchscreen, the touch panel 20, 30 may be mounted on the LCD panel with a small air gap (not shown), or bonded to the display with an index-matching adhesive 85.

The pixel pitch for projected capacitive touch panels may, for example, be in the range of from about 6 to 7 mm. Touch location can be determined more accurately, to about 1 mm, by signal processing and interpolation. If the line width/spacing for the traces 22 is approximately 10 μm to 20 μm, it can be calculated that a projected capacitive touch panel of at least 20 inches (measured diagonally) is possible for a TCC sheet resistance of about 4 ohms/square. Further optimization of the routing, signal processing and/or noise suppression allows for production of even larger touch panels (for example, greater than 40 or 50 inches diagonally).

As will be appreciated from the above, certain example embodiments may include one or more low-E Ag-based coatings in a large area transparent touch electrode (LATTE) that can accommodate multi-touch points. The low-E Ag-based coatings may be used in place of, or together with, ITO in certain example embodiments. Furthermore, mutual capacitance and self-capacitance designs are contemplated herein.

Figure 8:
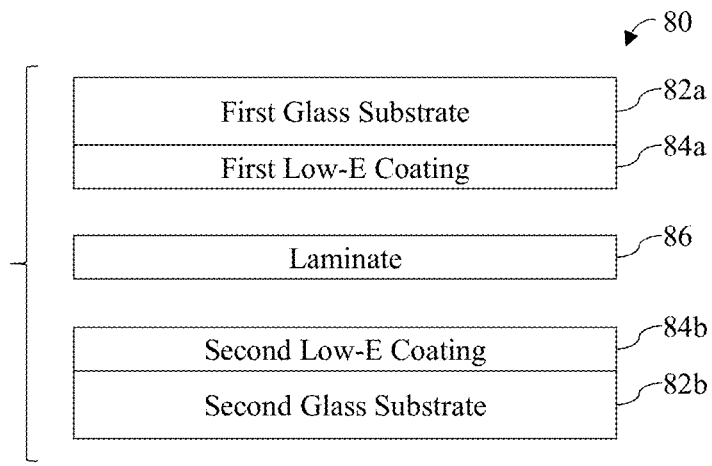
FIG. 8 is a cross-sectional view of a touch panel display subassembly using a self-capacitance design approach, in accordance with certain example embodiments.

As described above, a self-capacitance design approach generally is concerned with the capacitance of a single electrode to ground. Human body capacitance (or capacitance from a stylus or the like) increases the capacitance of the electrode to ground. In a self-capacitance sensor system, each electrode in an array may be measured individually, e.g., as rows and columns are scanned or the like. Self-capacitance design sensors may be used in connection with certain example embodiments. For example, FIG. 8 is a cross-sectional view of a touch panel display subassembly 80 using a self-capacitance design approach, in accordance with certain example embodiments. The FIG. 8 example subassembly 80 includes first and second glass substrates 82a and 82b respectively supporting first and second low-E Ag-based coatings 84a and 84b. The first and second low-E Ag-based coatings 84a and 84b are separate self-capacitance touch electrodes, with one measuring a first direction (e.g., the x-direction) and the other measuring a second direction (e.g., the y-direction). A laminate material 86 may be used to bond the first and second substrates 82a and 82b together, with the first and second low-E Ag-based coatings 84a and 84b being protected by virtue of being sandwiched between the first and second substrates 82a and 82b. The laminate material 86 may be a generally optically clear material such as, for example, PET, PVB, EVA, PU, and/or the like.

Figure 9:
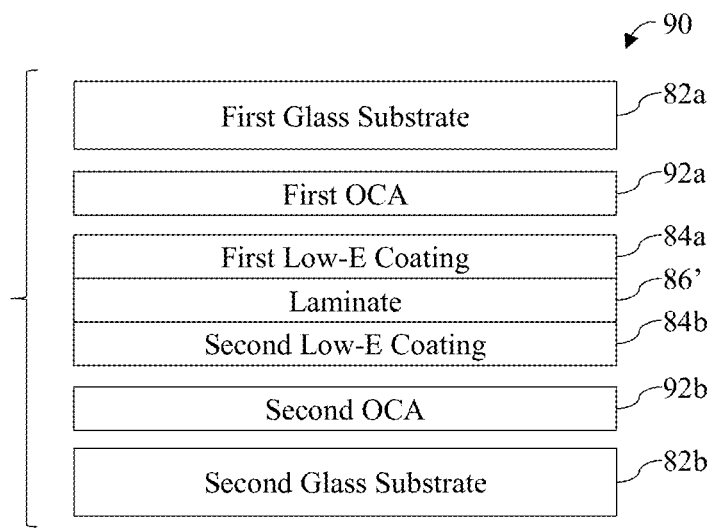
FIG. 9 is a cross-sectional view of a touch panel display subassembly using another self-capacitance design approach, in accordance with certain example embodiments.

FIG. 9 is a cross-sectional view of a touch panel display subassembly 90 using another self-capacitance design approach, in accordance with certain example embodiments. The FIG. 9 example subassembly 90 functions similarly to the FIG. 8 example subassembly 80. However, in this case, the laminate material 86' in the FIG. 9 example is shown supporting both of the first and second low-E Ag-based coatings 84a and 84b. The laminate material 86' may be pre-coated with the first and second low-E Ag-based coatings 84a and 84b. It may be received in a roll form, and rolled out in certain manufacturing methods, in order to orient the first and second low-E Ag-based coatings 84a and 84b towards the first and second substrates 82a and 82b. An optically clear adhesive (OCA) may be used to bond the subassembly 90 together. In this regard, first and second OCA materials 92a and 92b are shown as being interposed between the laminate material 86' and the first and second glass substrates 82a and 82b, respectively.

Figure 10:
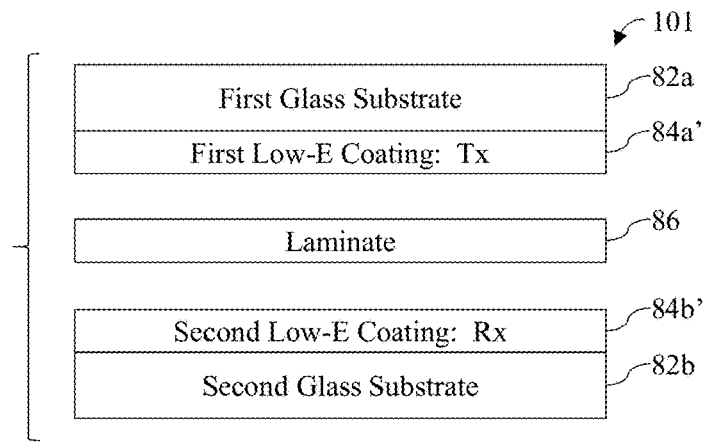
FIG. 10 is a cross-sectional view of a touch panel display subassembly using a mutual capacitance design approach, in accordance with certain example embodiments.

In a mutual capacitance sensor, capacitance is measured between two electrodes. One electrode functions as the drive or transmit electrode, and the other electrode functions as the sense or receive electrode. Human body capacitance (or stylus capacitance, etc.) "steals" the charge, which decreases the capacitance between the electrodes. In a mutual capacitance sensor system, each electrode intersection in an array of electrode pairings may be measured individually. Mutual capacitance design sensors also may be used in connection with certain example embodiments. For example, FIG. 10 is a cross-sectional view of a touch panel display subassembly 101 using a mutual capacitance design approach, in accordance with certain example embodiments. In the FIG. 10 example subassembly 101, the first low-E coating 84a' is used for transmission and the second low-E coating 84b' is used for receiving. It will be appreciated that the transmit and receive functionality may be reversed in certain example embodiments. Similar to the FIG. 8 example, the FIG. 10 example subassembly 101 has the first and second low-E coatings 84a' and 84b' supported by the first and second glass substrates 82a and 82b, respectively, with the subassembly 101 being bonded together via laminate material 86. The first and second low-E coatings 84a' and 84b' may be organized as rows and columns in two layers, in a "bar and stripe" configuration, etc.

Figure 11:
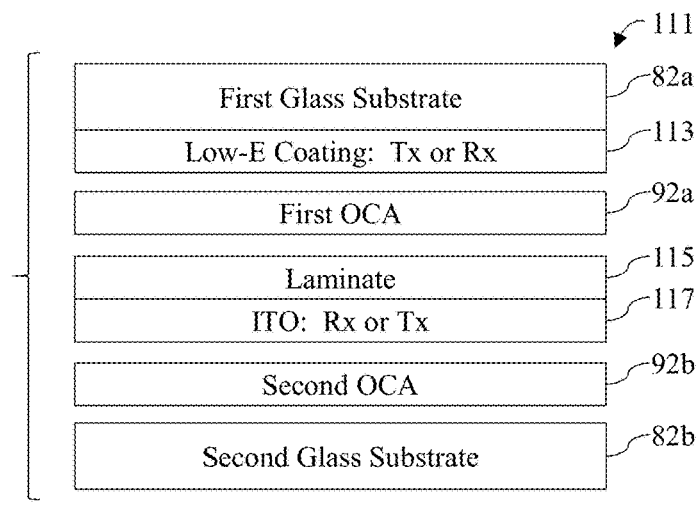
FIG. 11 is a cross-sectional view of a touch panel display subassembly using another mutual capacitance design approach, in accordance with certain example embodiments.

FIG. 11 is a cross-sectional view of a touch panel display subassembly 111 using another mutual capacitance design approach, in accordance with certain example embodiments. In the FIG. 11 example subassembly 111, the transmit and receive electrodes are of different types and are supported by different types of substrates. More particularly, in FIG. 11, the first glass substrate 82a supports a transmit or receive low-E coating 113, and the laminate material 115 supports the other type (receive or transmit) of electrode 117, which is shown as being of or including ITO. The laminate material 115 may be PET, PVB, EVA, PU, and/or the like. Similar to as noted above, it may be a rolled material supporting the ITO 117, and it may be unrolled prior to subassembly 111 being laminated together. First and second OCA materials 92a and 92b are shown as being interposed between the laminate material 115 and the first and second glass substrates 82a and 82b, respectively. Although the electrode 117 is shown as being of or include ITO, it will be appreciated that another material (such as, for example, a metal mesh, carbon nanotubes, carbon nanobuds, and/or the like) may be used instead of the ITO. It also will be appreciated that instead of the shown configuration, (1) the low-E coating 113 may be supported by the laminate material 115 and the other electrode 117 may be supported by the first glass substrate 82a as if they were reversed in the FIG. 11 example, (2) the low-E coating 113 may be supported by the second glass substrate 82b and other electrode 117 may be supported by the laminate material 115 on a side opposite the second glass substrate 82b, (3) other electrode 117 may be supported by the second glass substrate 82b and the low-E coating 113 may be supported by the laminate material 115 on a side opposite the second glass substrate 82b, etc.

Figure 12:
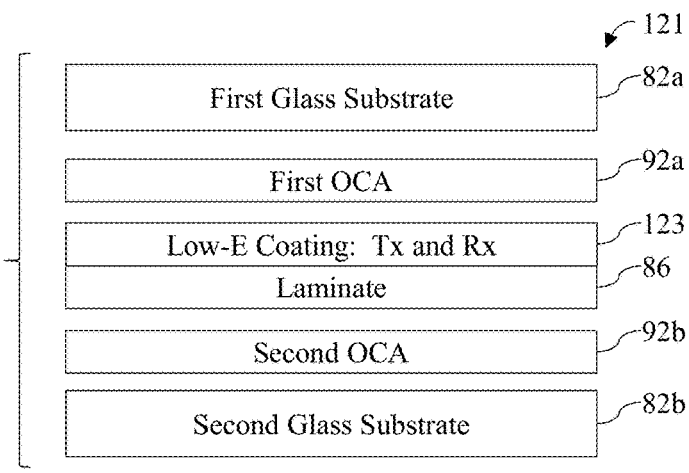
FIG. 12 is a cross-sectional view of a touch panel display subassembly using yet another mutual capacitance design approach, in accordance with certain example embodiments.

In addition to the possible configurations described above in connection with FIG. 10, a one layer arrangement may be used in certain example embodiments. This may include, for example, a configuration with an interlocking diamond pattern with bridges (e.g., similar to FIG. 1(a) or the like), in a caterpillar design (e.g., similar to FIG. 3 or the like), etc. This may be used in connection with a design arrangement similar to that shown in FIG. 7, or in FIG. 12. That is, both the FIG. 7 and the FIG. 12 examples may include a low-E coating that is patterned with a single layer mutual touch pattern, with the low-E coating being used for both transmit and receive functionality in a mutual capacitance design. In the FIG. 7 example, the substrate supporting the low-E coating is the glass substrate. In the FIG. 12 example, the low-E coating 123 may be supported by the laminate material 86. The FIG. 12 example subassembly 121 also includes first and second OCA materials 92a and 92b being interposed between the laminate material 86 and the first and second glass substrates 82a and 82b, respectively.

It will be appreciated that the low-E coatings discussed in connection with FIGS. 8-12 may be the same as, or similar to, the low-E coatings described above (e.g., in connection with FIGS. 4-6).

It will be appreciated that techniques used herein may be used in connection with glass, non-glass (e.g., plastic), or both glass and non-glass substrates. For instance, in certain example embodiments, in the case where one or both of the conductive coatings are on a plastic film or other non-glass substrate, there need not be a second glass substrate but instead the non-glass substrate may be directly bonded to the display.

It will be appreciated that the low-E Ag-based coatings used in large area transparent touch electrodes as described herein are advantageous over ITO-based electrodes and other technologies for a number of different reasons. For example, low-E Ag-based coatings as described herein tend to have a lower haze as compared to ITO-based coatings. The former typically will have haze less than 0.5%, more preferably less than 0.4% and sometimes as low as 0.25%. ITO, on the other hand, typically has a haze even when in a heat treated state of around 1%, and sometimes in the 0.75%-1% range. The reduction in haze is advantageous when it comes to providing higher resolution displays (e.g., as there currently is a move towards providing "4K resolution" products), and for facilitating readability in outdoor and sunny or high-light conditions. Reflection also tends to be lower for the low-E Ag-based coatings described herein, as compared to ITO-based coatings. The low-E Ag-based coatings described herein may have a reflection lower than 10%, more preferably lower than 7%, and typically around 5%. By contrast, ITO-based coatings typically have a reflection of about 10%.

In a somewhat related regard, low-E Ag-based coatings as described herein offer a better resistivity/transmission tradeoff as compared to ITO-based coatings. ITO-based coatings typically offer a resistance of about 100 ohms per square with 89-90% transmission after heat treatment, whereas low-E Ag-based coatings as described herein can achieve a resistance of less than 25 ohms per square, preferably less than 15 ohms per square, more preferably less than 10 ohms per square, still more preferably less than 10 ohms per square, and sometimes less than 7 ohms per square, with 88% transmission. The low-E Ag-based coatings as described herein preferably have a transmission of at least 80%, more preferably at least 85%, and still more preferably at least 87-88%. The move to low-E Ag-based coatings as described herein is advantageous in this respect as it provides for lower power consumption, faster touch response times (lower latency), and enables capacitive touch technology to be employed on larger displays. ITO-based sensors with these metrics typically can be used with a 40 inch maximum panel, whereas the example techniques described herein can be used in connection with 40 inch, 50 inch, 110 inch, or even greater sized panels (e.g., as measured by a diagonal of the panel). It will be appreciated that the transmission, sheet resistance, haze, reflection measurements apply when the low-E Ag-based coating is blanked coated onto a 3 mm thick clear soda-lime-silica glass, absent an antireflective coating.

In order to achieve the resistivity/transmission tradeoff noted above, ITO typically is thermally activated, post deposition, to increase the material's optical transmission and decrease its sheet resistance. The heat treatment process enables ITO-based coatings to improve their performance. Unfortunately, however, this introduces an extra processing step and limits the types of substrates to which they can be easily applied. By contrast, a low-E Ag-based coating may be formed using a room temperature coating process that does not necessarily require thermal activation. This opens the door to using different types of substrates (e.g., plastic substrates, PET, PVB, etc.), while providing significantly better optical and resistance properties as compared to non-heat treated ITO. In certain example embodiments, none of the touch panel substrates will be heat treated. In certain example embodiments, none of the touch panel substrates on which the low-E Ag-based coating is formed will be heat treated. On the other hand, in certain example embodiments, the low-E Ag-based coating of certain example embodiments may be heat treatable, which would allow large stock sheets to be coated, cut to size, and then heat treated (e.g., thermally tempered) with the coatings thereon, which can reduce manufacturing costs significantly.

ITO in general also is brittle, and the heat treatment can increase its brittleness. By contrast, low-E Ag-based coatings as described herein are more flexible and thus can be more easily incorporated into flexible, curved, and other types of displays.

ITO on PET is shipped in a non-heat treated condition on cylindrical rolls and may be heat treated when it is received by a customer to compensate for the rigidity of heat treated ITO. But because low-E, Ag-based coatings of the type described herein do not necessarily need to be thermally activated to achieve a good resistivity/transmission tradeoff, a customer can use a low-E Ag-based coating on PET/PVB directly off a roll without heat treating in some instances.

It will be appreciated that the technology disclosed herein may be used in connection with a wide variety of applications including, for example, electronic displays, vending machines, mirrors, storefronts, office walls, etc.

With respect to vending machines, for example, current models typically incorporate simple hardware keypads or small touchscreens on the side of the vending machine to facilitate user selection of an item therein and to enable product purchases to be made. However, by using the low-E Ag-based coatings described herein, it is possible to create new vending machine user interfaces that are more interesting and interactive than conventional interfaces. Additional customer engagement, entertainment, and sales opportunities can be realized by enabling new user interfaces, e.g., as set forth herein. It will be appreciated, for example, that increasing customer interaction may enable vending machine operators to facilitate multi-product purchases by creating better bundling opportunities, reduce customer balk rates by creating a more engaging and entertaining user experience, reduce incorrect product purchases by giving customers better and more intuitive control over the ways in which they make their selections, reduce the number of the steps or user-interactive operations needed to purchase products, realize energy and costs savings (e.g., as compared to having a vending machine with an LCD device with touch panel functionality), increase durability (e.g., compared to LCD devices with touch with touch panel functionality), etc.

Figure 13:
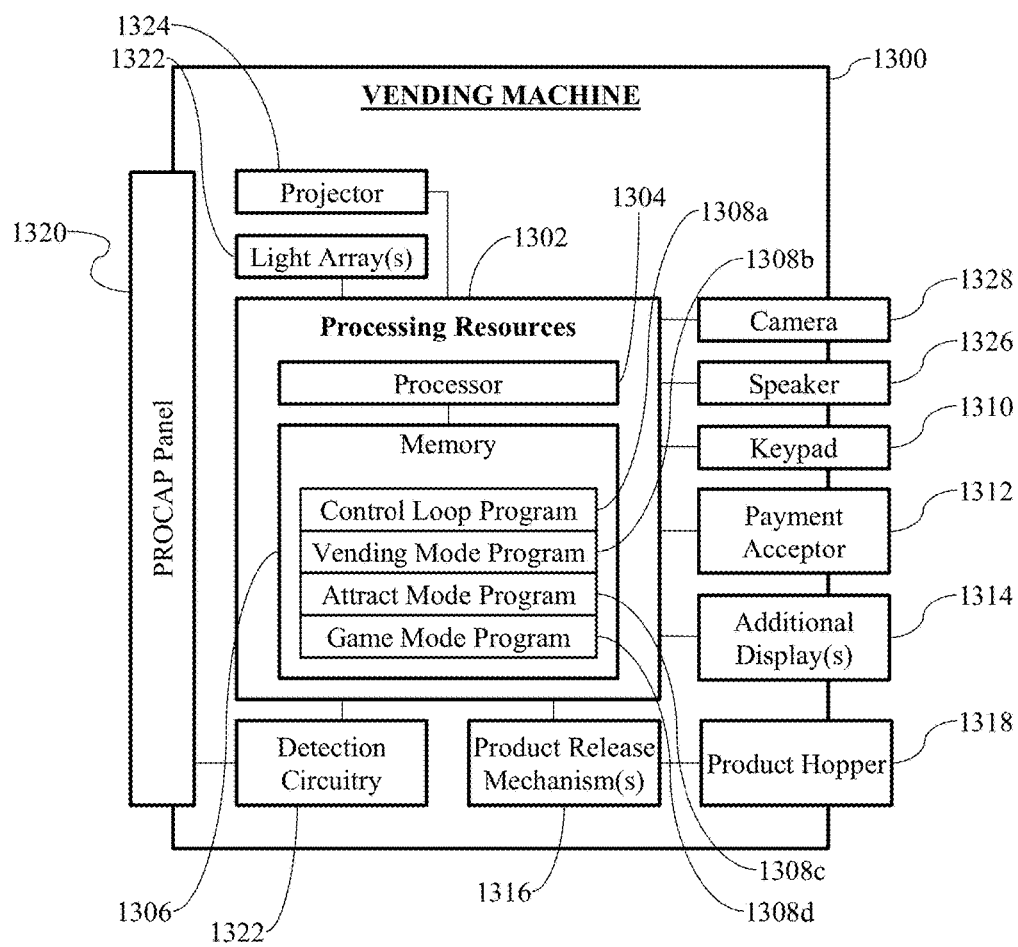
FIG. 13 is a block diagram showing example components of a vending machine incorporating a capacitive touch panel in accordance with certain example embodiments.
Figure 14A:
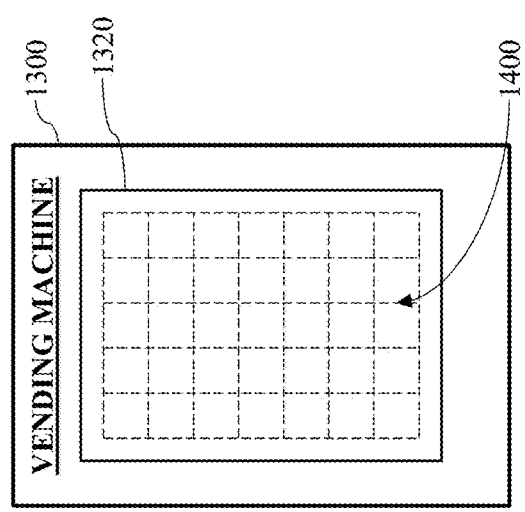
FIGS. 14(a) to 14(e) schematically demonstrate how the FIG. 13 example vending machine may be used to vend products, in accordance with certain example embodiments.
Figure 14B:
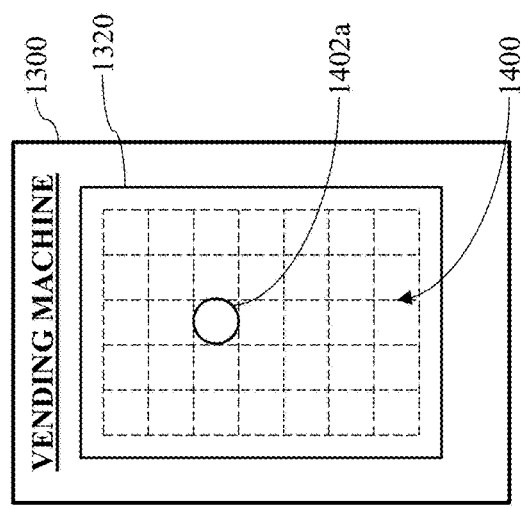
Figure 14C:
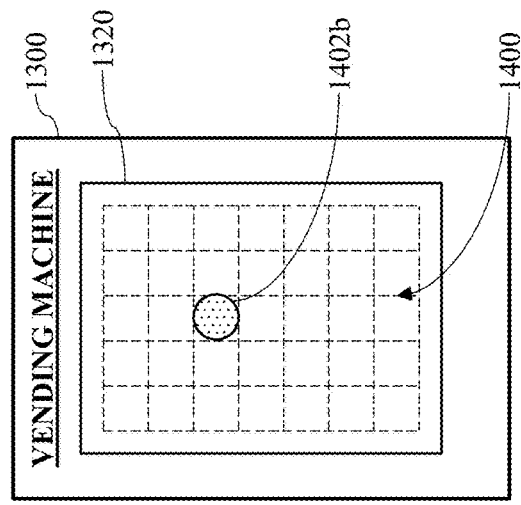

Referring once again to the drawings, FIG. 13 is a block diagram showing example components of a vending machine 1300 incorporating a capacitive touch panel 1320 in accordance with certain example embodiments. The FIG. 13 example vending machine 1300 includes processing resources 1302, comprising at least one processor 1304 and a memory 1306 operably coupled thereto. The memory 1306 may include any suitable combination of transitory or non-transitory computer readable storage media, and it store a plurality of programs 1308a-1308d. In this regard, control loop program 1308a controls the overall functioning of the vending machine 1300, e.g., enabling the vending machine 1300 to switch between vending, attract, and game modes. These modes are controlled by different programs, namely, the vending mode program 1308b, the attract mode program 1308c, and the game mode program 1308d. Further details concerning the example programs 1308a-1308d are provided below.

More conventional vending machine related hardware may be provided to vending machine 1300 as an alternative or supplement to touch-based user interactivity. That is, more conventional vending machine related hardware may be provided to vending machine 1300 to increase fault tolerant, to provide a completely separate and more conventional approach to interacting with the vending machine 1300 (e.g., for potential customers who are less comfortable with touch-based technology), to provide additional or alternative control mechanisms for more limited touch-based technology offerings, etc. For example, keypad 1310 may be used to make selections from products available in stock in the vending machine 1300, to provide inputs when selecting a game to play or actually playing a game, etc. A payment acceptor 1312 may accept coins, bank notes, credit/debit cards, RFID or other short-distance radio-based payment technology, etc. One or more additional displays 1314 may be provided to confirm selections, facilitate more secure payment-related input (e.g., PIN codes), show supplemental information (e.g., game instructions), etc. A mechanical product release mechanism 1316 may release products in response to receipt of a selection and appropriate payment (e.g., by uncoiling holder, using a mechanical arm to pick up and move a product, etc.). Released products may be dropped into a product hopper 1318.

The projected capacitive touch panel 1320 may be large and serve as both a window into the display area (e.g., as a conventional merchanidizer), as well as a means for providing input to the vending machine 1300. The capacitive touch panel 1320 may receive input from a user (e.g., corresponding to a touch, hover operation, swipe or gesture, etc.). The detection circuitry 1322 works with electrodes of the capacitive touch panel 1320 as disclosed above, for example, and provides signals to the processing resources 1302 for further action, as appropriate.

One or more light arrays 1322 and projector 1324 help illuminate or otherwise convey information to a potential customer by illuminating or projecting onto the capacitive touch panel 1320. The light array(s) 1322 may include LED lights of different colors, for example. The speaker 1326 may provide audio output, e.g., during game play, during attract mode operation, to confirm selections, etc. The camera 1328 may facilitate user detection, periods of inoperability, etc.

The vending mode program 1308*a*, once entered into, may facilitate user selection of items from the vending machine 1300 in a pre-programmed manner and in accordance with touch-based user interactivity. In this regard, FIGS. 14(*a*) to 14(*e*) schematically demonstrate how the FIG. 13 example vending machine 1300 may be used to vend products, in accordance with certain example embodiments. As will be appreciated from FIGS. 14(*a*) to 14(*e*), products are arranged in a grid-based manner, e.g., where cells in the grid 1400 correspond to different product areas. Each cell in the grid may have a plurality of detectable locations, e.g., such that multiple electrodes are provided to each cell.

As shown in FIG. 14(*a*), there are no active selections taking place. FIG. 14(*b*) indicates that the customer desires the product in area 1402*a*. When the customer brings his/her hand or finger into close relative proximity to the capacitive touch panel 1320 at area 1402*a*, a hover operation may be triggered by the change in capacitance (e.g., in connection with detecting circuitry 1322 and potential further processing using the processing resources 1302 and/or the vending mode program 1308*b*). The hover or proximity operation, once detected, may trigger a first visual change in the appearance of the area corresponding to the hover. This is indicated by the stippling in hover area 1402*b* in FIG. 14(*c*).

The first visual change in the appearance of the area corresponding to the hover shown in FIG. 14(*c*) may include, for example, the corresponding product area changing to a first solid translucent color (e.g., in a generally rectangular, circular, or other shape), flashing, being bordered, or the like, e.g., so that the user can determine where the hover is taking place while still having a sufficiently good view of the in-lying product to have confidence that the right product may subsequently be selected. These changes may be realized by triggering the light array(s) 1322 and/or projector 1324 to highlight hover area 1402*b*. In certain example embodiments, first and second light arrays 1322 may be actuated to highlight an entire row and an entire column, with the overlap being a sort of "bull's-eye" in a distinctive coloration that highlights the hover area 1402*b*.

It will be appreciated that the user may move his/her hand and cause the hover area 1402*b* to move, causing an update to where the first visual change is depicted and restoring the previously highlighted area to its non-highlighted (e.g., non-illuminated) state.

A second visual change in the appearance may take place when the user's hand or finger actually touches the capacitive touch panel 1320. For example, a hover operation may cause flashing in the corresponding area, border highlighting, highlighting with a first color, a row-and-column bull's-eye in the corresponding area, or the like, and the second visual change may shift the highlight approach to a solid highlight (e.g., of the same or different color as what flashes or is indicated in border highlighting, to a second solid color different from a first solid color, etc.).

In certain example embodiments, a gesture may be used to confirm a selection. For example, as shown in FIG. 14(*d*), a check-like gesture 1402*c* in a highlighted area may confirm the selection and cause the product release mechanism 1316 to release the product corresponding to the confirmed selected area to be placed in the product hopper 1318. In certain example embodiments, holding the area for a predefined time period (e.g., 1, 2, or 3 seconds) may be used to confirm the selection. In certain example embodiments, hover detection need not be used, and a selection may be made by pressing the area corresponding to the desired product sequentially, pressing the area corresponding to the desired product once and then holding it for a predefined time period, pressing the area corresponding to the desired product and then enacting a gesture, etc.

It will be appreciated that hovering over the glass with a hand or finger may be used to determine which product to select (and optionally trigger a first visual change in the corresponding area), and that then moving the hand or finger closer to glass (without touching the glass) may be used to select the product (and optionally trigger a second visual change in the corresponding area), potentially with the touch itself confirming the selection and triggering the sale.

It will be appreciated that touching the glass in the vicinity of the product one wants to select the product to be purchased may cause a light highlighting the product to be illuminated, controlling lights and/or the projector 1324 behind the glass. It also will be appreciated that this approach to product selection can reduce the number of steps or user operations needed to purchase a product compared to using a numeric keypad to select a product, and/or can reduce "transcription errors" in typing in a code corresponding to a product to be selected.

Once a selection is made and the product has been released, a customer may be incentivized or encouraged to purchase additional products. For example, one or more additional products area may be highlighted (e.g., using a third visual change). As shown in FIG. 14(*e*), areas 1402*d*1 and 1402*d*2 are highlighted. The products that are highlighted may be selected at random or based on predefined rules. With respect to the latter, predefined rules may be programmed into vending machine 1300 and/or otherwise stored to the memory 1306. Rules may include highlighting areas surrounding the area from which the product purchase was made, highlighting similar products to the product that was purchased, highlighting products that complement the product that was purchased, etc. With respect to similarity-based highlighting, rules may be defined to highlight products by the same manufacturer, of a similar main component (e.g., multiple chocolate-based products may be highlighted following the selection of a chocolate-flavored product), multiple healthy snacks may be highlighted following the selection of a first health-food product, etc. With respect to complementary product highlighting, certain snack items that are believed to go well together or oftentimes be sold well together may be highlighted. For example, chocolate and peanut butter based products may be highlighted one after the other.

In certain example embodiments, product selections and sales may be tracked and a record may be kept. For instance, the memory 1306 may maintain a log of what product was purchased and when it was purchased. If a subsequent selection and purchase is made within a predefined time period following a first selection and purchase thereby indicating that multiple products were selected and purchased within a common session (e.g., by the same customer), the record or log might reflect that fact as well. The camera 1328 and/or a large-scale change in capacitance of the touch panel 1320 indicative of a user moving away may be used to detect and/or confirm selections within a common session, as well. Associations between products purchased in a session may be maintained. Based on information from the log, a Bayesian or other model/algorithm may be used to predict the likelihood of a second product being purchased based on a given first product being purchased. A model of associations may be refined by taking into account whether and how much money was inserted ahead of time, whether the user was recognized (e.g., using facial recognition as facilitated by the camera 1328), time of day, day of week, etc. For example, this data may be considered known information in the context of a Bayesian model. Output form an associative model or algorithm may be used to drive the highlighting of other products. In this way, it may be possible to increase the likelihood of products being sold as a bundle.

It will be appreciated that certain example embodiments may use the same or similar techniques to track selections without purchases being made. For example, a customer may select a first product and then select and purchase a second different product after seeing the latter. Although the first product may not be purchased, the sequential selections may nonetheless indicate an association between the products and/or a likelihood that they should be tied together and used in a subsequent highlighting procedure because they could be commonly bundled together.

Suggestive sales also may be based on body recognition. The capacitive touch panel 1320 may also tell the rough dimensions of a human at or by the vending machine 1300. For example, changes in capacitance over a large area can be an indication of how tall and/or wide a person is, and/or potentially how much body fat the person has. Suggestive selling of certain products can then occur based on the potential purchaser's body type.

As indicated above, proximity sensing may be used in certain example embodiments. In this regard, large-scale changes in the capacitance of the capacitive touch panel 1320, and/or changes in capacitance over a large area that sweeps from one side to another, may indicate the presence of a human at or passing by the vending machine 1300. When a person is detected, the vending machine 1300 may enter into an attract mode, e.g., in accordance with the attract mode program 1308b. The attract mode program 1308b may cause lights to illuminate, sound to play using the speaker 1326, etc. In a related regard, a vending machine 1300 may go into a low-power or "sleep" mode after periods of inactivity. Proximity sensing may enable a vending machine 1300 in low-power or "sleep" mode to "wake up," causing lights to turn on, etc.

Certain example embodiments may involve a product realize mechanism 1316 that includes a user-controllable robotic arm. For example, many drink machines use a robotic arm to pick-up the product inside the vending machine. Certain example embodiments may enable the user to control a visible arm, whether to pick up a product that it is near, where to deposit it, etc.

In certain example embodiments, different selection processes for product can occur in the lower portion of the glass, e.g., to allow the machine to be Americans with Disabilities Act (ADA) approved. For example, certain example embodiments may incorporate simple on-glass touch buttons enabling product selection and purchase, utilization of gestures (e.g., swipe, pinch, etc.) to select a product, the addition of an on-glass scroll-wheel to enable product selection and purchasing through a carousel-like display and selection means (which may be independent of a separate on-glass selection button), etc. For example, when a given mode is activated, push buttons may be illuminated enabling different user interface controls to be presented at a lower portion of the capacitive touch panel 1320 and with large, easily legible buttons. A given area may be highlighted to start with (e.g., the top-left corner, the center item, etc.). Newly displayed arrow buttons may be used to navigate (by moving the highlighted area) up, down, left, and right; a newly displayed wheel may be used to move the highlighted area through a given progression (e.g., left to right and top to bottom); etc. A separate select/purchase button may be used to trigger a purchase in this mode.

Certain example embodiments also support gamification of the vending machine 1300. The combination of touch functionality and simple lighting features in the vending machine 1300 may be used to create game functionality, e.g., under control of the processing resources 1302 executing the game mode program 1308.

Figure 15A:
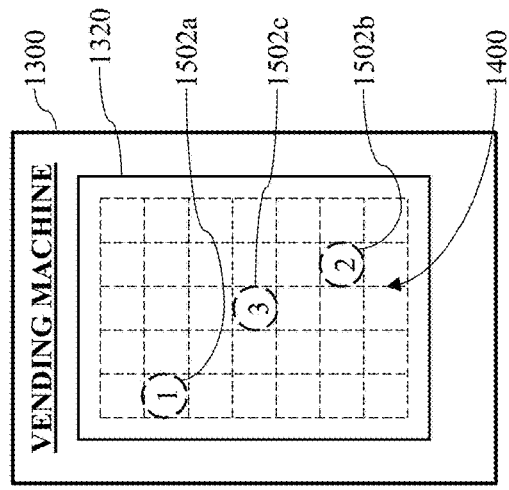
Figure 14E:
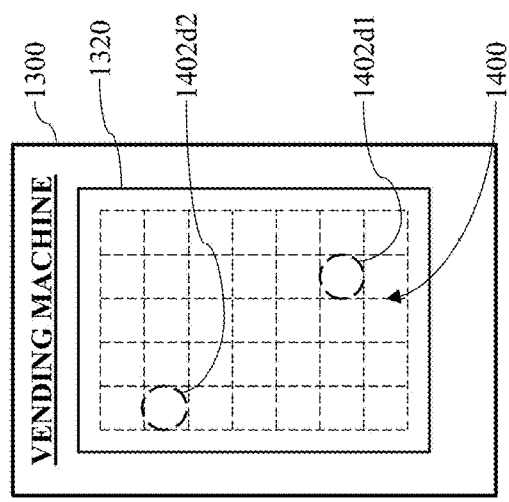
Figure 14D:
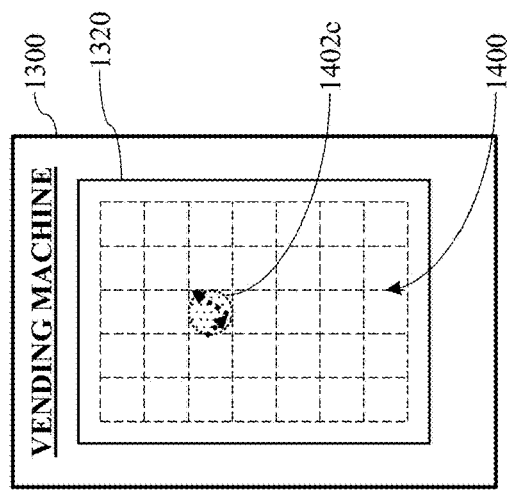

Games that might be played with simply touch and light related functionality include, for example, whack-a-mole, Simon Says, Tetris, Pong, brick-breaker game, memory, and other games. In this regard, FIGS. 15(a) to 15(e) schematically demonstrate how the FIG. 13 example vending machine may be used to play games, in accordance with certain example embodiments. FIG. 15(a), for example, may be used in connection with a whack-a-mole or Simon Says type game. For the former, the processing resources 1302 may randomly select a cell in the grid 1400. The cell may light up, prompting the user to touch the cell. The cell may stay illuminated for a predefined amount of time or until the user touches it, whichever comes first. In the FIG. 15(a) example, and simply to illustrate the way in which the game are played, it is noted that areas 1502a-1502c are lit up sequentially. The game may be played for a predefined time period, until a certain number of cells are touched within the predefined amount of time, until a given number of highlighted cells are missed, etc. It will be appreciated that multiple cells may be illuminated at once, and that the capacitive touch panel 1320 may support plural simultaneous touches, making the game more challenging.

With respect to a Simon Says type game, area 1502a may be temporarily illuminated, prompting the user to push that area. If the user successfully pushes the area within a predefined amount of time, areas 1502a and 1502b are sequentially temporarily illuminated, prompting the user to push those areas in that order. If the user does not successfully push the areas in order within a predefined amount of time, the game may be considered over. However, if the user does so, areas 1502a-1052c are sequentially temporarily illuminated, prompting the user to push those areas in that order. The game continues in this way until the user does not successfully push the areas in order within a predefined amount of time, a given number of areas are pressed successfully, etc. Different tones may accompany the different highlighted areas.

In both cases, the highlight may be accomplished by illuminating a given area using the light array(s) 1322, via the projector 1324, and/or the like. Outlining also may be used in certain example embodiments.

Figure 15B:
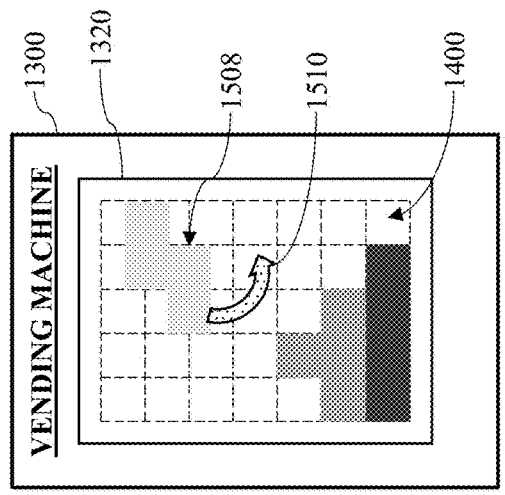
Figure 15B:
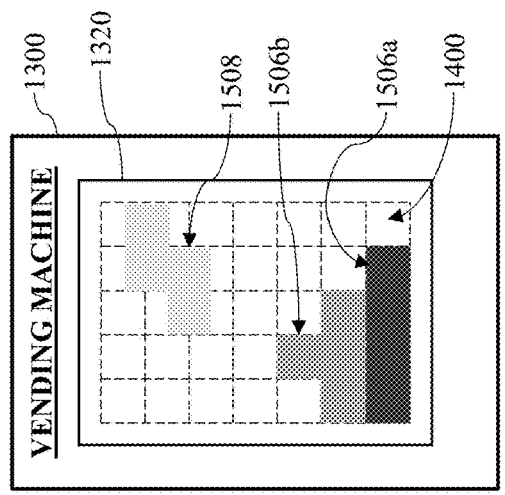
Figure 15B:
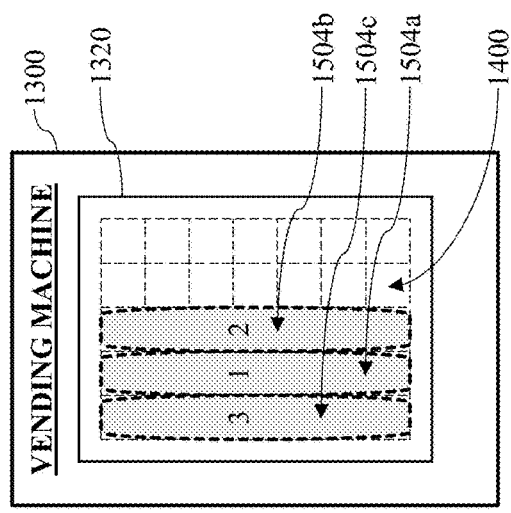

Although the FIG. 15(a) example shows individual cells being lit up, an easier version of the games may be played by using larger areas, such as entire rows or columns. As an example, FIG. 15(b) shows entire columns being illuminated. An example random pattern is shown, with the areas sequentially including columns 1504a-1504c.

FIGS. 15(c)(1) and 15(c)(2) help illustrate how a Tetris-type game may be played. As is known, blocks of different configurations descend from the top of the screen. In the illustrated example, this includes bar shape block 1506a and T-shape block 1506b, which are already at the base of the grid 1400 and thus cannot be moved. As a new element descends, it may be rotated with a gesture made relative to the display. For example, as illustrated block 1508 may be rotated with counter-clockwise gesture 1510. It also may be moved horizontally via panning or swiping type gestures (provided that there is enough "real estate" in the grid 1400). In certain example embodiments, the gesture may be made on, over, or near, the descending block. In certain example embodiments, the gesture may be made anywhere on the capacitive touch panel 1320. In still other example embodiments, the gesture may be made in a dedicated input area.

Figure 15E:
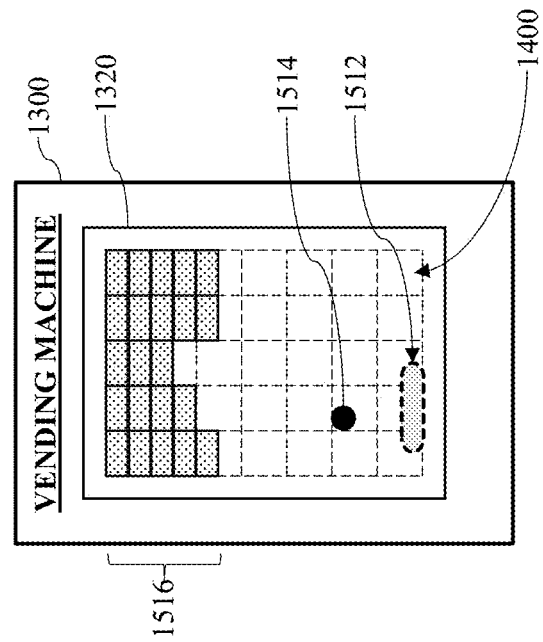
Figure 15D:
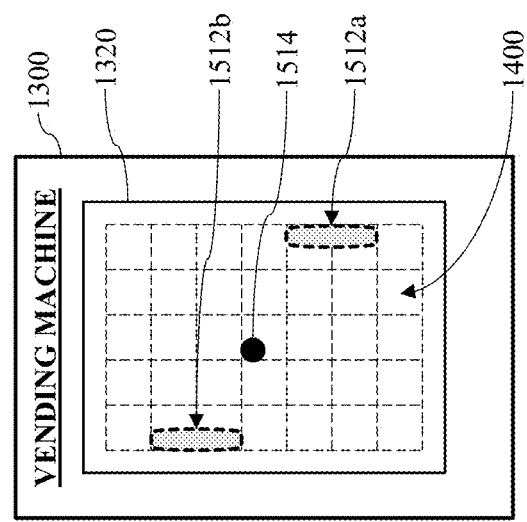

FIGS. 15(d) and 15(e) show paddle-type games that may be implemented in certain example embodiments. In FIG. 15(d), a Pong-type game is playable. The Pong-type game may be a one-player game (in which one of paddles 1512a and 1512b is user-controllable), or a two-player game (where first and second paddles 1512a and 1512b are operably by different users, as the capacitive touch panel 1320 is configured to accept multiple simultaneous touches). As is known in the game of Pong, users try to get a ball past their opponents' paddles. In FIG. 15(d), for example, a first player tries to get ball 1514 passed the second paddle 1512b (regardless of whether it is user- or computer-operated) by causing the first paddle 1512a to move the ball while also trying to keep the ball 1514 from getting past the first paddle 1512a. The ball 1514 may elastically collide with the paddles 1512a-1512b, as well as upper and lower walls corresponding to the upper and lower edges of the grid 1400 in the FIG. 15(d) example. The paddles may be movable using swipe gestures in a generally vertical direction, by touching and moving generally vertically the appropriate paddle, by using a dedicated input area, and/or the like. Although a generally vertical arrangement is shown in FIG. 15(d), horizontal-type arrangements are also contemplated.

FIG. 15(e) is an example brick-breaking game. As shown in FIG. 15(e), a user is able to move the paddle 1512 generally horizontally to prevent the ball 1514 from going past it and to cause the bricks 1516 to be broken. The ball 1514 may elastically collide with the paddle 1512, the bricks 1512 (after causing individual ones of the bricks to be broken upon contact), left and right walls corresponding to the left and right edges of the grid 1400 in the FIG. 15(e) example, and the upper wall corresponding to the upper edge of the grid 1400 in the FIG. 15(e) example.

The paddles and balls in FIGS. 15(d) and 15(e), as well as the bricks in FIG. 15(e) may be shown using the light array(s) 1322 and/or the projector 1324. Their movements may be controlled by the processing resources 1302, e.g., in accordance with aspect of the game mode program 1308d. The processing resources 1302 may help keep track of the progress of the game.

A Memory-game also may be played. In such cases, the products may be at least partially concealed by having colored blocks placed over them. Touching a block may reveal the concealed product or code, and matching a like product or code or aspect of a product (e.g., food type, manufacturer, etc.) may cause the blocks to be removed.

It will be appreciated that the keypad 1310 may be used to provide alternative or additional input, e.g., in selecting and/or playing the games.

It will be appreciated that prizes may be awarded for achieving a goal in a game. For example, a prize may be given for whacking a certain number of moles, advancing to a certain complexity in the Simon Says game, beating the computer-controlled paddle in the Pong-type game, clearing a level in the brick-breaking game, uncovering all of the blocks within a certain number of guesses for the Memory-type game, etc. The prize may be a free product, a discount usable on the vending machine 1300, place on a roll of "winners" maintained by the vending machine 1300, and/or the like.

In certain example embodiments, an RFID and/or credit card reader may be laminated in the glass in or near the touch panel 1320. The corresponding hardware may be coupled to the processing resources 1302. In certain example embodiments, RFID, NFC, and/or other short-distance radio communication signals may be read by the coating applied to the touch panel 1320 itself. Electrodes formed in the touch panel 1320 specifically "tuned" to the appropriate frequencies may be formed. Such electrodes may be located in a given area, which may be marked as a payment acceptance area, or they may be distributed throughout the major surface of the glass comprising the touch panel 1320.

In certain example embodiments, transparent projector technology may be used in combination with touch technology to provide large size advertising and the ability to interact with the vending machine 1300. For example, when the vending machine 1300 is in an attract mode, the projector 1324 may project on the entire or substantially the entire surface of the capacitive touch panel 1320 to try to entice a potential customer to interact with the vending machine 1300, to apprise the passers-by of promotions or advertisements stored to the memory 1306 by an operator or other authorized individual, etc. Some of these advertisements or promotions may be user-interactive allowing, for example, users to receive more information about an advertisement or promotion by touching the capacitive touch panel 1320 accordingly and/or as prompted. In certain example embodiments, a dedicated area of the capacitive touch panel 1320 (e.g., above and/or below the grid 1400) may be reserved for projections so that vending-related operations of the vending machine 1300 may proceed as advertisements and/or promotions are run. In certain example embodiments, advertisements and/or promotions may be provided on all or substantially all of the capacitive touch panel 1320, unless or until vending-related operations of the vending machine 1300, at which point the advertisements and/or promotions may be moved to a smaller area of the capacitive touch panel 1320 and/or one or more additional displays 1314.

It will be appreciated that certain self-capacitance designs may be thought of as being "dual self-capacitance designs," e.g., in the sense that there may be two self-capacitance sensors (e.g., one on surface 2 and one on surface 3), with the surface 2 sensor measuring X position and the surface 3 sensor measuring Y position, or the like. It also will be appreciated that although certain example sensor configurations have been described in detail, other sensor configurations may be used in connection with the technology disclosed herein. See, for example, Geoff Walker's "Fundamentals of Projected-Capacitive Touch Technology" presentation, version 1.2, for SID Display Week 2014, dated Jun. 1, 2014, the entire contents of which are hereby incorporated herein by reference.

In certain example embodiments, glass substrate 40 with coating 41, 51, 61 thereon may be heat treated (e.g., thermally tempered), e.g., after coating, or chemically strengthened before coating. In general, the substrates described herein may be heat treated (e.g., heat strengthened and/or thermally tempered), and/or chemically tempered, in certain example embodiments. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

Although an element, layer, layer system, coating, or the like, may be said to be "on" or "supported by" a substrate, layer, layer system, coating, or the like, other layers and/or materials may be provided therebetween.

In certain example embodiments, a vending machine is provided. A cabinet includes a plurality of product placement areas. A window to the product placement areas is connected to the cabinet. A first transparent multi-layer low-emissivity (low-E) coating is supported by the window and patterned into a first set of electrodes, with the first set of electrodes being configured to enable all or part of the window to be used as a touch panel configured to accept touch-related inputs to the vending machine. Processing resources include at least one processor and a memory. The memory comprises instructions that, when executed, are configured to: (a) receive touch-related operation information corresponding to accepted touch-related inputs, with the touch-related operation information being indicative of touch positions and touch types, and with the touch types including touches of the window, non-touch proximity detections, and gestures; and (b) control the vending machine to operate in one of a plurality of different operating modes and respond to received touch-related operation information, the different operating modes including product-vending and game-playing modes.

In addition to the features of the preceding paragraph, in certain example embodiments, touch positions may be defined in relation to the product placement areas.

In addition to the features of either of the two preceding paragraphs, in certain example embodiments, touch positions may overlap and/or be coextensive with the product placement areas.

In addition to the features of any of the three preceding paragraphs, in certain example embodiments, the window may comprise first and second substantially parallel substrates that are laminated together, with the first substrate supporting the first low-E coating, with the second substrate supporting a transparent conductive coating that is patterned into a second set of electrodes, and with the first and second sets of electrodes being configured to enable all or part of the window to be used as the touch panel.

In addition to the features of the preceding paragraph, in certain example embodiments, the transparent conductive coating may be a second low-E coating.

In addition to the features of the preceding paragraph, in certain example embodiments, the first and second low-E coatings each may include a plurality of thin film layers, and the first and second low-E coatings may have substantially the same thin film layer structures.

In addition to the features of any of the three preceding paragraphs, in certain example embodiments, the first and second sets of electrodes may be configured to enable all or part of the window to be used as a self-capacitance touch panel. Alternatively, in addition to the features of any of the three preceding paragraphs, in certain example embodiments, one of the first and second sets of electrodes may be configured as transmit electrodes and the other may be configured as receive electrodes, and the first and second sets of electrodes may be configured to enable all or part of the window to be used as a mutual capacitance touch panel.

In addition to the features of any of the seven preceding paragraphs, in certain example embodiments, the window may further comprise optically-clear adhesive.

In addition to the features of any of the eight preceding paragraphs, in certain example embodiments, the window may include only one low-E coating, the first set of electrodes may be patterned into transmit and receive electrodes, and/or the first set of electrodes may be configured to enable all or part of the window to be used as a mutual capacitance touch panel.

In addition to the features of any of the nine preceding paragraphs, in certain example embodiments, at least one light source may be configured to project light onto the window to prompt and/or respond to touch-related input under control of the processing resources and in accordance with the operating mode that is operating.

In addition to the features of the preceding paragraph, in certain example embodiments, the at least one light source and the first set of electrodes may be configured to enable all or part of the window to be used as a projected capacitive touch panel.

In addition to the features of either of the two preceding paragraphs, in certain example embodiments, the processing resources may be configured to control the at least one light source to provide a visual indication relative to a given one of the product placement areas, e.g., responsive to a detection of touch-related input provided in connection with that product placement area.

In addition to the features of any of the three preceding paragraphs, in certain example embodiments, the processing resources may be configured to control the at least one light source to provide a visual indication relative to a given one of the product placement areas to prompt an action to be taken, and/or to indicate an action being taken, relative to the given product placement area, e.g., in connection with a game play mode of a game.

In addition to the features of any of the 13 preceding paragraphs, in certain example embodiments, the processing resources may be configured to control the vending machine to vend a product in response to a predetermined series of inputs and/or input types being detected in relation to a given one of the product placement areas using the window as the touch panel, with the to-be vended product corresponding to the given product placement area.

In addition to the features of any of the 14 preceding paragraphs, in certain example embodiments, a third transparent multi-layer low-E coating may be supported by the window and patterned into third electrodes, e.g., with the third electrodes being tuned to receive frequencies from a contactless payment instrument brought into close relative proximity to the vending machine, and the memory may include further instructions that are executable to process received frequencies to enable payment for items being vended by the vending machine.

In certain example embodiments, a vending machine is provided. A cabinet includes a plurality of product placement areas. A capacitive touch panel is configured to accept touch-related inputs to the vending machine. A first glass substrate is arranged as a window to the product placement areas, with the first glass substrate being connected to the cabinet and forming part of the touch panel. A first transparent multi-layer low-E coating is supported by the first glass substrate and is patterned into a first set of electrodes, e.g., with the first low-E coating including a layer comprising Ag, a layer comprising zinc oxide directly below and in contact with the layer comprising Ag, a layer comprising Ni and/or Cr directly above and in contact with the layer comprising Ag, and at least one silicon-inclusive layer above and at least one silicon-inclusive layer below the layer comprising Ag. Processing resources include at least one processor and a memory, with the memory comprising instructions that, when executed, are configured to control the vending machine to operate in one of a plurality of different operating modes and, in connection therewith, respond to touch-related operation signals received from the touch panel, the different operating modes including product-vending and game-playing modes.

In addition to the features of the preceding paragraph, in certain example embodiments, a second glass substrate may be substantially parallel to and spaced apart from the first glass substrate, the second glass substrate may also forming part of the touch panel, and a transparent conductive coating may be supported by the second glass substrate and patterned into a second set of electrodes.

In addition to the features of either of the two preceding paragraphs, in certain example embodiments, at least one light source may be configured to project light onto the window to prompt and/or respond to touch-related input under control of the processing resources and in accordance with the operating mode that is operating, e.g., with the touch panel being a projected capacitive touch panel making use of the at least one light source.

In addition to the features of the preceding paragraph, in certain example embodiments, the processing resources may be configured to control the at least one light source, e.g., to provide a visual indication relative to a given one of the product placement areas to: prompt an action to be taken, and/or to indicate an action being taken, relative to the given product placement area, in connection with a game play mode of a game; and/or vend a product in response to a predetermined series of inputs and/or input types being detected in relation to the given one of the product placement areas using the window as the touch panel, the to-be vended product corresponding to the given product placement area.

In addition to the features of any of the four preceding paragraphs, in certain example embodiments, a third transparent multi-layer low-E coating may be supported by the first substrate and patterned into third electrodes, e.g., with the third electrodes being tuned to receive frequencies from a contactless payment instrument brought into close relative proximity to the vending machine.

Method of making and/or using the vending machines of any of the preceding 20 paragraphs may be provided.

For example, in certain example embodiments, a method of making a vending machine is provided. The method comprises: connecting to a cabinet that includes a plurality of product placement areas a capacitive touch panel that is configured to accept touch-related inputs to the vending machine, wherein the touch panel includes a first glass substrate that is arranged as a window to the product placement areas, a first transparent multi-layer low-emissivity (low-E) coating supported by the first glass substrate and being patterned into a first set of electrodes, the first low-E coating including a layer comprising Ag, a layer comprising zinc oxide directly below and in contact with the layer comprising Ag, a layer comprising Ni and/or Cr directly above and in contact with the layer comprising Ag, and at least one silicon-inclusive layer above and at least one silicon-inclusive layer below the layer comprising Ag; and configuring processing resources including at least one processor and a memory to interface with the touch panel and to control the vending machine to operate in one of a plurality of different operating modes and, in connection therewith, respond to touch-related operation signals received from the touch panel, the different operating modes including product-vending and game-playing modes.

In addition to the features of the preceding paragraph, in certain example embodiments, at least one light source that is configured to project light onto the window to prompt and/or respond to touch-related input under control of the processing resources and in accordance with the operating mode that is operating may be provided, e.g., wherein: the touch panel is a projected capacitive touch panel making use of the at least one light source; and/or the processing resources are configured to control the at least one light source to provide a visual indication relative to a given one of the product placement areas to (a) prompt an action to be taken, and/or to indicate an action being taken, relative to the given product placement area, in connection with a game play mode of a game, and (b) vend a product in response to a predetermined series of inputs and/or input types being detected in relation to the given one of the product placement areas using the window as the touch panel, the to-be vended product corresponding to the given product placement area.

The forgoing exemplary embodiments are intended to provide an understanding of the disclosure to one of ordinary skill in the art. The forgoing description is not intended to limit the inventive concept described in this application, the scope of which is defined in the following claims.

What is claimed is:

1. A vending machine, comprising:
a cabinet including a plurality of product placement areas;
a window to the product placement areas, the window being connected to the cabinet;
a first transparent multi-layer low-emissivity (low-E) coating supported by the window and patterned into a first set of electrodes, the first set of electrodes being configured to enable all or part of the window to be used as a touch panel configured to accept touch-related inputs to the vending machine; and
processing resources including at least one processor and a memory, the memory comprising instructions that, when executed, are configured to:
receive touch-related operation information corresponding to accepted touch-related inputs, the touch-related operation information being indicative of touch positions and touch types, the touch types including touches of the window, non-touch proximity detections, and gestures; and
control the vending machine to operate in one of a plurality of different operating modes and respond to received touch-related operation information, the different operating modes including product-vending and game-playing modes.

2. The vending machine of claim 1, wherein touch positions are defined in relation to the product placement areas.

3. The vending machine of claim 2, wherein touch positions overlap and are coextensive with the product placement areas.

4. The vending machine of claim 1, wherein the window comprises first and second substantially parallel substrates that are laminated together, the first substrate supporting the first low-E coating, the second substrate supporting a transparent conductive coating that is patterned into a second set of electrodes, the first and second sets of electrodes being configured to enable all or part of the window to be used as the touch panel.

5. The vending machine of claim 4, wherein the transparent conductive coating is a second low-E coating.

6. The vending machine of claim 5, wherein the first and second low-E coatings each include a plurality of thin film layers, and wherein the first and second low-E coatings have substantially the same thin film layer structures.

7. The vending machine of claim 4, wherein the first and second sets of electrodes are configured to enable all or part of the window to be used as a self-capacitance touch panel.

8. The vending machine of claim 4, wherein one of the first and second sets of electrodes is configured as transmit electrodes and the other is configured as receive electrodes, the first and second sets of electrodes being configured to enable all or part of the window to be used as a mutual capacitance touch panel.

9. The vending machine of claim 8, wherein the transparent conductive coating is a second low-E coating.

10. The vending machine of claim 4, wherein the window further comprises optically-clear adhesive.

11. The vending machine of claim 1, wherein:
the window includes only one low-E coating;
the first set of electrodes is patterned into transmit and receive electrodes; and
the first set of electrodes is configured to enable all or part of the window to be used as a mutual capacitance touch panel.

12. The vending machine of claim 1, further comprising at least one light source configured to project light onto the window to prompt and/or respond to touch-related input under control of the processing resources and in accordance with the operating mode that is operating.

13. The vending machine of claim 12, wherein the at least one light source and the first set of electrodes are configured to enable all or part of the window to be used as a projected capacitive touch panel.

14. The vending machine of claim 12, wherein the processing resources are configured to control the at least one light source to provide a visual indication relative to a given one of the product placement areas, responsive to a detection of touch-related input provided in connection with that product placement area.

15. The vending machine of claim 12, wherein the processing resources are configured to control the at least one light source to provide a visual indication relative to a given one of the product placement areas to prompt an action to be taken, and/or to indicate an action being taken, relative to the given product placement area, in connection with a game play mode of a game.

16. The vending machine of claim 1, wherein the processing resources are configured to control the vending machine to vend a product in response to a predetermined series of inputs and/or input types being detected in relation to a given one of the product placement areas using the window as the touch panel, the to-be vended product corresponding to the given product placement area.

17. The vending machine of claim 1, further comprising a third transparent multi-layer low-E coating supported by the window and patterned into third electrodes, the third electrodes being tuned to receive frequencies from a contactless payment instrument brought into close relative proximity to the vending machine, wherein the memory includes further instructions that are executable to process received frequencies to enable payment for items being vended by the vending machine.

18. A vending machine, comprising:
a cabinet including a plurality of product placement areas;
a capacitive touch panel configured to accept touch-related inputs to the vending machine;
a first glass substrate arranged as a window to the product placement areas, the first glass substrate being connected to the cabinet and forming part of the touch panel;
a first transparent multi-layer low-emissivity (low-E) coating supported by the first glass substrate and being patterned into a first set of electrodes, the first low-E coating including a layer comprising Ag, a layer comprising zinc oxide directly below and in contact with the layer comprising Ag, a layer comprising Ni and/or Cr directly above and in contact with the layer comprising Ag, and at least one silicon-inclusive layer above and at least one silicon-inclusive layer below the layer comprising Ag; and
processing resources including at least one processor and a memory, the memory comprising instructions that, when executed, are configured to control the vending machine to operate in one of a plurality of different operating modes and, in connection therewith, respond to touch-related operation signals received from the touch panel, the different operating modes including product-vending and game-playing modes.

19. The vending machine of claim 18, further comprising:
a second glass substrate that is substantially parallel to and spaced apart from the first glass substrate, the second glass substrate also forming part of the touch panel; and
a transparent conductive coating supported by the second glass substrate and patterned into a second set of electrodes.

20. The vending machine of claim 18, further comprising at least one light source configured to project light onto the window to prompt and/or respond to touch-related input under control of the processing resources and in accordance with the operating mode that is operating, wherein the touch panel is a projected capacitive touch panel making use of the at least one light source.

21. The vending machine of claim 20, wherein the processing resources are configured to control the at least one light source to provide a visual indication relative to a given one of the product placement areas to:
prompt an action to be taken, and/or to indicate an action being taken, relative to the given product placement area, in connection with a game play mode of a game; and
vend a product in response to a predetermined series of inputs and/or input types being detected in relation to the given one of the product placement areas using the window as the touch panel, the to-be vended product corresponding to the given product placement area.

22. The vending machine of claim 18, further comprising a third transparent multi-layer low-E coating supported by the first substrate and patterned into third electrodes, the third electrodes being tuned to receive frequencies from a contactless payment instrument brought into close relative proximity to the vending machine.

23. A method of making a vending machine, comprising:
connecting to a cabinet that includes a plurality of product placement areas a capacitive touch panel that is configured to accept touch-related inputs to the vending machine, wherein the touch panel includes a first glass substrate that is arranged as a window to the product placement areas, a first transparent multi-layer low-emissivity (low-E) coating supported by the first glass substrate and being patterned into a first set of electrodes, the first low-E coating including a layer comprising Ag, a layer comprising zinc oxide directly below and in contact with the layer comprising Ag, a layer comprising Ni and/or Cr directly above and in contact with the layer comprising Ag, and at least one silicon-inclusive layer above and at least one silicon-inclusive layer below the layer comprising Ag; and configuring processing resources including at least one processor and a memory to interface with the touch panel and to control the vending machine to operate in one of a plurality of different operating modes and, in connection therewith, respond to touch-related operation signals received from the touch panel, the different operating modes including product-vending and game-playing modes.

24. The method of claim 23, further comprising providing at least one light source that is configured to project light onto the window to prompt and/or respond to touch-related input under control of the processing resources and in accordance with the operating mode that is operating, wherein:

the touch panel is a projected capacitive touch panel making use of the at least one light source; and the processing resources are configured to control the at least one light source to provide a visual indication relative to a given one of the product placement areas to (a) prompt an action to be taken, and/or to indicate an action being taken, relative to the given product placement area, in connection with a game play mode of a game, and (b) vend a product in response to a predetermined series of inputs and/or input types being detected in relation to the given one of the product placement areas using the window as the touch panel, the to-be vended product corresponding to the given product placement area.

25. A method of operating the vending machine of claim 1.

* * * * *